United States Patent
Goodwin et al.

(10) Patent No.: US 8,016,038 B2
(45) Date of Patent: Sep. 13, 2011

(54) METHOD AND APPARATUS TO FACILITATE FORMATION SAMPLING

(75) Inventors: Anthony R. H. Goodwin, Sugar Land, TX (US); Julian J. Pop, Houston, TX (US); Stephen Yeldell, Sugar Land, TX (US); Jason Hueber, Sugar Land, TX (US); Pierre-Yves Corre, Eu (FR); Stephane Briquet, Houston, TX (US); Alexander Zazovsky, Houston, TX (US); Carsten Sonne, Birkerod (DE)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 12/361,640

(22) Filed: Jan. 29, 2009

(65) Prior Publication Data

US 2009/0200016 A1    Aug. 13, 2009

Related U.S. Application Data

(63) Continuation-in-part of application No. 11/763,237, filed on Jun. 14, 2007, now Pat. No. 7,878,243.

(60) Provisional application No. 61/027,122, filed on Feb. 8, 2008, provisional application No. 60/845,332, filed on Sep. 18, 2006.

(51) Int. Cl.
*E21B 47/00* (2006.01)
(52) U.S. Cl. .................. 166/264; 166/272.1; 166/60
(58) Field of Classification Search ................... 166/264, 166/272.1, 60
See application file for complete search history.

(56) References Cited

U.S. PATENT DOCUMENTS

| | | | |
|---|---|---|---|
| 2,693,342 A | 11/1954 | Lynes |
| 3,104,712 A | 9/1963 | Whitten |
| 3,859,851 A | 1/1975 | Urbanosky |
| 4,127,169 A | 11/1978 | Tubin et al. |
| 4,353,249 A | 10/1982 | Lagus et al. |
| 4,392,376 A | 7/1983 | Lagus et al. |
| 4,485,868 A | 12/1984 | Sresty et al. |
| 4,860,581 A | 8/1989 | Zimmerman et al. |
| 4,936,139 A | 6/1990 | Zimmerman et al. |
| 5,056,595 A | 10/1991 | Desbrandes |
| 6,065,544 A | 5/2000 | Holbert |

(Continued)

FOREIGN PATENT DOCUMENTS

GB    2418938    4/2006

(Continued)

OTHER PUBLICATIONS

Burgess, Keith et al., Formation Testing and Sampling Through Casing, Oilfield Review, Spring 2002, pp. 47-57.

*Primary Examiner* — William P Neuder
*Assistant Examiner* — Yong-Suk Ro
(74) *Attorney, Agent, or Firm* — David J. Smith

(57) ABSTRACT

A downhole tool for extracting a sample from a subsurface formation includes an emitter of electromagnetic energy configured to heat water in the subsurface formation. A method for extracting a sample from a subsurface formation involves conveying a downhole tool in a wellbore drilled through the subsurface formation, the downhole tool having an emitter of electromagnetic energy configured to heat water in the subsurface formation, and actuating the emitter to expose a portion of the formation to electromagnetic energy.

19 Claims, 17 Drawing Sheets

U.S. PATENT DOCUMENTS

| | | | |
|---|---|---|---|
| 6,208,316 B1 * | 3/2001 | Cahill | 343/909 |
| 6,269,882 B1 | 8/2001 | Wellington et al. | |
| 6,301,959 B1 | 10/2001 | Hrametz et al. | |
| 6,699,019 B2 | 3/2004 | Myers et al. | |
| 6,755,246 B2 | 6/2004 | Chen et al. | |
| 6,766,854 B2 | 7/2004 | Ciglenec et al. | |
| 6,772,839 B1 | 8/2004 | Bond | |
| 7,175,770 B2 | 2/2007 | Whisman | |
| 7,347,262 B2 | 3/2008 | Tarvin et al. | |
| 2003/0217845 A1 | 11/2003 | Sherwood et al. | |
| 2004/0093937 A1 | 5/2004 | Hashem | |
| 2004/0104341 A1 | 6/2004 | Betancourt et al. | |
| 2005/0155760 A1 | 7/2005 | Hill et al. | |
| 2005/0279499 A1 | 12/2005 | Tarvin et al. | |
| 2006/0000606 A1 | 1/2006 | Fields et al. | |
| 2006/0042793 A1 | 3/2006 | Del Campo et al. | |
| 2006/0137873 A1 | 6/2006 | Caudwell et al. | |
| 2006/0155472 A1 | 7/2006 | Venkataramanan et al. | |
| 2006/0162935 A1 | 7/2006 | MacDougall | |
| 2006/0248949 A1 | 11/2006 | Gregory et al. | |
| 2007/0215348 A1 | 9/2007 | Corre | |
| 2008/0066904 A1 | 3/2008 | Van Hal et al. | |
| 2008/0078581 A1 | 4/2008 | Goodwin et al. | |
| 2008/0156486 A1 | 7/2008 | Ciglenec et al. | |
| 2009/0008079 A1 * | 1/2009 | Zazovsky et al. | 166/60 |

FOREIGN PATENT DOCUMENTS

| | | |
|---|---|---|
| GB | 2420135 | 5/2006 |
| GB | 2431673 | 5/2007 |
| GB | 2445846 | 7/2008 |
| WO | WO2007048991 | 5/2007 |
| WO | W02008036520 | 3/2008 |
| WO | WO2008150825 | 12/2008 |

* cited by examiner

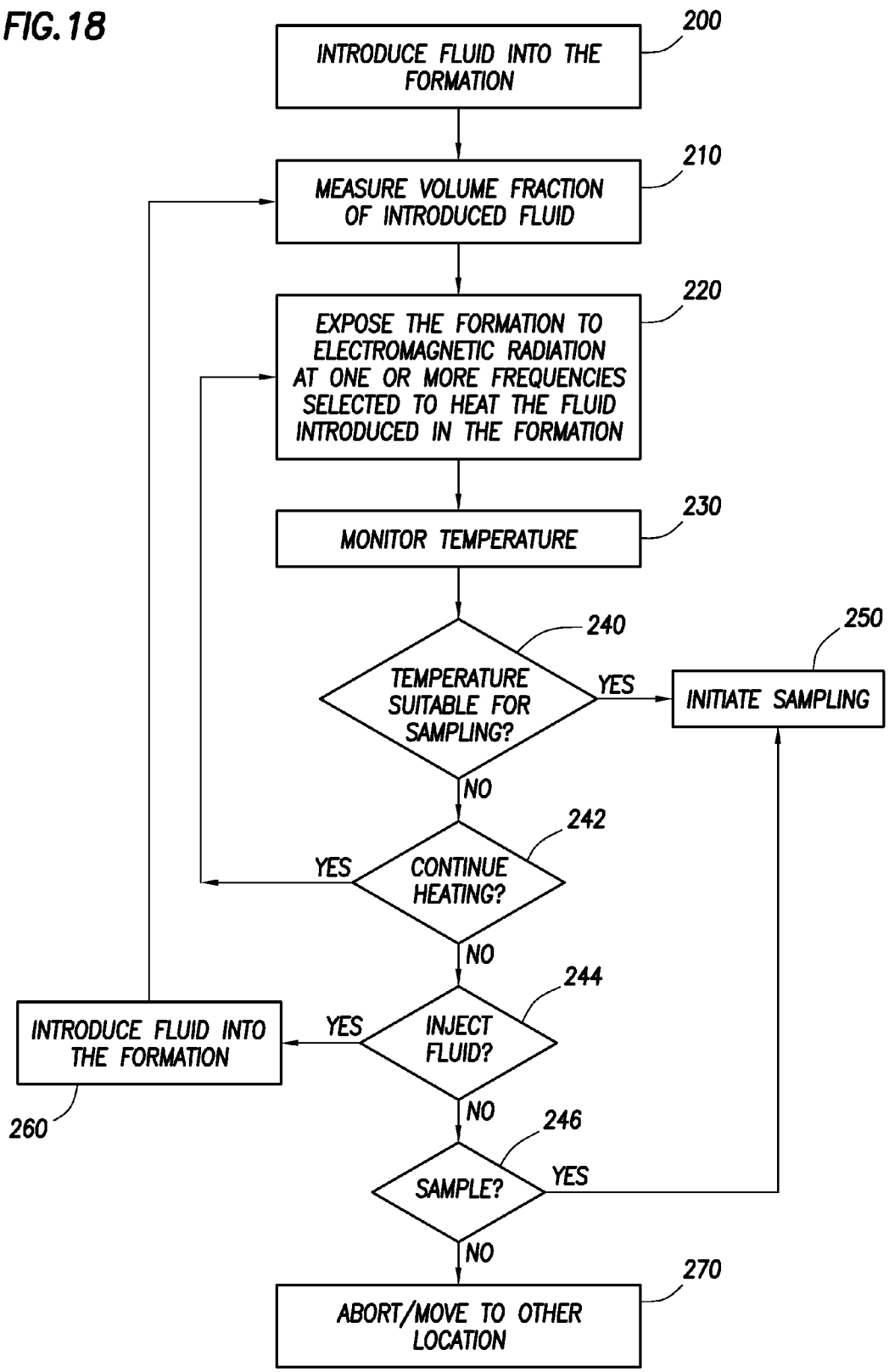

METHOD AND APPARATUS TO FACILITATE FORMATION SAMPLING

CROSS-REFERENCE TO RELATED APPLICATIONS

This application claims the benefit of U.S. Provisional Application No. 61/027,122, entitled "METHOD AND APPARATUS TO MOBILIZE A FORMATION USING ELECTROMAGNETIC ENERGY TO PERMIT HYDROCARBON SAMPLING," filed Feb. 8, 2008, the disclosure of which is hereby incorporated herein by reference.

This application is also a continuation-in-part application of U.S. patent application Ser. No. 11/763,237, now U.S. Patent Application publication No. 2008/0078581, entitled "Method and Apparatus for Sampling High Viscosity Formation Fluids", filed Jun. 14, 2007, now U.S. Pat. No. 7,878,243 which application claims the benefit of U.S. Provisional Application No. 60/845,332, entitled "Methods and apparatus for subsurface measurements, stimulation and testing," filed Sep. 18, 2006, the disclosures of which are hereby incorporated herein by reference. This application is also related to U.S. patent application Ser. No. 12/368,738, filed on Feb. 10, 2009, and titled "Single Packer System for Use in Heavy Oil Environments."

BACKGROUND OF THE DISCLOSURE

Worldwide, there is an estimated recoverable reserve of more than 950 billion barrels (150.million cubic meters) of what is known as "conventional" liquid hydrocarbon (oil) disposed in subsurface reservoirs. Of the foregoing, about 600 billion barrels (96.million cubic meters), about 66%, are disposed in the geographic region of the Middle East. 85% of conventional liquid hydrocarbon is located in the eastern hemisphere.

The estimated recoverable reserve of so called "heavy oil" is about 430 billion barrels (70.million cubic meters) and there are estimated to be 650 billion barrels (103.million cubic meters) of bitumen (solid hydrocarbon associated with Earth formations). Of the total recoverable reserve of the foregoing two hydrocarbon sources about 70% (equivalent to about 830 billion barrels of oil) are geographically disposed in the Western hemisphere with 81% of such bitumen located within North America and 62% percent of the heavy oil located within South America. The total world oil reserves, including heavy oil, are believed to be about 2 trillion barrels. At a consumption rate of 100 million barrels per day, such total world oil reserves have an estimated life of about 55 years. Thus, the above reserves of heavy oil and bitumen are important to the world hydrocarbon economy, and may be sampled to provide optimal recovery and design production strategies.

According to the United States Geological Survey (USGS) heavy oil may be categorized according to the density and viscosity of the fluid. The definitions, listed in Table 1, were obtained from a web page published by the USGS at the Uniform Resource Locator (URL) http://pubs.usgs.gov/fs/fs070-03/fs070-03.html.

TABLE 1

Definition of the type of heavy oil based on the density $\rho$, API gravity and viscosity $\eta$, of the fluid along with comments concerning mobility and current extraction methods

| Definition | $\rho$ (kg/m$^3$) | API Gravity | $\eta$ (cP) | Comments |
| --- | --- | --- | --- | --- |
| Medium heavy oil | 903 to 946 | 25 to 18 | 100 to 10 | Mobile fluid at reservoir conditions |
| Extra heavy oil | 933 to 1021 | 20 to 7 | 10,000 to 100 | Immobile fluid at reservoir conditions |
| Tar sands and bitumen | 985 to 1021 | <12 | >10,000 | Immobile solid at reservoir conditions |

In addition to the USGS, the United Nations Information Centre for Heavy Crude and Tar Sands offers definitions for bitumen as petroleum having a viscosity above about 10,000 cP (centipoise) while petroleum with viscosity below about 10,000 cP is classified as heavy oil. Heavy oil is further classified into heavy oil with an American Petroleum Institute ("API") gravity between 10 and 20 degrees API gravity and extra heavy oil with a gravity below about 10 degrees API. In the present disclosure, the foregoing definitions may be used for heavy oils, which are typically liquids at subsurface reservoir temperature, and bitumen, that is typically solid (glass like) at subsurface reservoir temperatures.

Samples of formation fluids in subsurface reservoirs may be extracted by inserting instruments referred to as "sampling tools", or having a similar designation, into a wellbore drilled through the subsurface formations. Such tools extract a sample by selectively exposing the formation to a chamber in the tool having a lower pressure than the fluid pressure in the pore spaces of the formations. There are a number of reasons why hydrocarbon samples should be acquired from subsurface reservoirs for evaluation of such reservoirs. For heavy oil and bitumen, samples may be important because they may be used to evaluate production strategies and select the most energy efficient and environmentally acceptable methods for extracting the hydrocarbons from the subsurface reservoirs. The sampling process may, as is the case for liquid oil, extract samples with a chemical composition and physical properties that are representative of the hydrocarbons as they exist in the reservoir. The time efficiency of sampling increases with increasing fluid flow-rate, Q, that may be determined from Darcy's law:

$$Q \propto \Delta p \cdot k / \eta \qquad (1)$$

where $\Delta p$ is the pressure difference applied by a formation fluid sampling tool to withdraw the fluid from the subsurface reservoir, $\eta$ the formation fluid viscosity and k the reservoir permeability. Darcy's law may be used to estimate the pressure difference created by the suction device between the pressure at the entrance to the sampling tool and the formation. For a fluid with effective viscosity 300 cP in a rock of permeability about 3.0 Darcies with a flow rate of 1 cm$^3$ s$^{-1}$ the pressure drop is about 3 MPa (about 435 psi) while for an effective viscosity of 3,000 cP the pressure difference is 33 MPa (about 4,786 psi). For many heavy oils the reservoir pressure is about 10 MPa (equivalent to 1,450 psi). A pressure drop of about 4,700 psi may be difficult to achieve while even that of 435 psi may induce an undesirable phase transition in the fluid being sampled.

According to equation (1), the flow rate Q increases by increasing either the pressure differential Δp or the reservoir permeability k and/or by decreasing the fluid viscosity η. As mentioned before, the magnitude of the pressure differential Δp may be limited by characteristics of the sampling tool (e.g., the sampling tool operation envelope), by existing fluid pressure in the reservoir and by the mechanical properties of the subsurface formation. For example, the value of the pressure differential Δp may be limited by a pressure differential value at which the formation fails. Also, the reservoir permeability k is an intrinsic property of the subsurface formation and, with exceptions such as hydraulic fracturing, may be practically difficult to change. Therefore, practical implementations for sampling low mobility formation fluids may rely on methods of decreasing the fluid viscosity η.

There are many methods that may be used to reduce viscosity and some of those methods may be preferred to avoid chemically altering the fluid as or before it is withdrawn into the sample taking tool. Sampling of low mobility fluids may be performed by either thermal (heating) or non-thermal methods, such as methods which rely on injecting a solvent into the subsurface formation to reduce the fluid viscosity. The thermal methods have an advantage over the non-thermal methods because the sample chemical composition is generally not changed as would be the case by introduction of a solvent.

A heavy oil or bitumen sample may preferably be chemically representative of the heavy oil or bitumen as it exists in the formation, so that, for example, a suitable production strategy may be determined from the sample. The method chosen to extract the sample may therefore involve increasing the mobility of the fluid to be sampled (mobility being related to the ratio of permeability to viscosity) in both the reservoir and within the sample taking tool so that the heavy oil or bitumen may be drawn into a sample retrieval vessel in the tool. The mobility enhancement may be achieved in such a manner that the sample composition either represents the important characteristics of the reservoir (heavy oil or bitumen) fluid sufficiently well or that the physical characteristics of the fluid have been changed in a reversible manner.

The use of electromagnetic radiation to heat heavy oil formations for the purpose of production of hydrocarbon therefrom has been investigated by others. For example, multiple radio frequency ("RF") sources separated by about 6 m were operated at frequencies between 2.3 and 13.6 MHz and power of up to 75 kW for about 25 days. Such was reported to have heated the formation to a temperature of 200° C. and recovered between 60 to 70% of the bitumen in place at a viscosity of about 100 cP. Others have reported modeling for electromagnetic heating of heavy oil at a frequency of 2.45 GHz, which is equivalent to that used in a domestic microwave oven. Still others have preformed field tests at frequencies of about 13.6 MHz. However, no modeling or experimental work using frequencies in the megahertz range, and relying on the presence of underground water to act as the energy absorber has been reported.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIG. 18 is a flow chart of yet another heating and sampling method according to one or more aspects of the present application.

DETAILED DESCRIPTION

Figure 1:
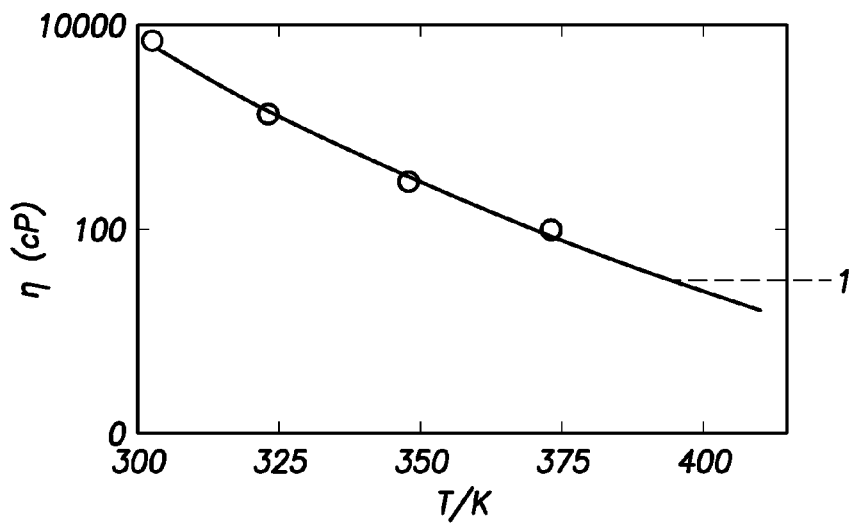
FIG. 1 is an example graph illustrating a relationship between viscosity and temperature in heavy oil.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

The present disclosure generally contemplates heating the formation to increase sampling efficiency, and in particular to reduce viscosity of the connate hydrocarbons in the reservoir. For reader convenience, examples of viscosity dependence of hydrocarbons against temperature and pressure are illustrated below.

The temperature dependence of viscosity may be represented by the empirically derived expression:

$$\ln(\eta/\eta^\circ) = a + \frac{b}{c+T} \qquad (2)$$

where $\eta^\circ = 1$ cP (or 1 mPa s). The constants a, b, and c of equation (2) may be obtained by a non-linear adjustment to measurements acquired at a fixed pressure. The measurements, shown by curve 1 in FIG. 1 (prior art) were fit to equation (2). Curve 1 in FIG. 1 represents coefficients a=−13.9693, b=6871.6821° K and c=0. It should be understood however that different hydrocarbons may exhibits different viscosity behaviors and that the values of the constants a, b, and c may vary from one hydrocarbon to the other.

The effect of pressure on viscosity depends on, among other things, the chemical composition of the fluid in question. An estimate of $(\partial\eta/\partial p)_T$ may be obtained from the measurements on a certified viscosity reference material called "S20", which is a mixture of hydrocarbons. At a value of the temperature t=60° C., the derivative of the viscosity with respect to pressure at constant temperature $(\partial\eta/\partial p)_T$ is approximately 0.2 cP·MPa$^{-1}$ while at a value of the temperature t=120° C., the derivative $(\partial\eta/\partial p)_T$ is approximately 0.05 cP·MPa$^{-1}$. Thus, even a pressure change of 10 MPa contributes no more than an additional 2 cP to the viscosity, and may therefore be neglected. In the forgoing, T is the absolute temperature, and t=T−273.15.

Apparatus, methods and experimental results described herein may utilize the presence of water (typically saline water) to act as an electromagnetic energy absorber and generate heat into the formation. Electromagnetic energy may thus be used to heat water. Then, thermal conduction from the water to the hydrocarbon may permit heating the hydrocarbon. Still for reader convenience, examples of temperature and/or frequency dependence of the complex permittivity of water (fresh or saline) are illustrated below.

Figure 2:
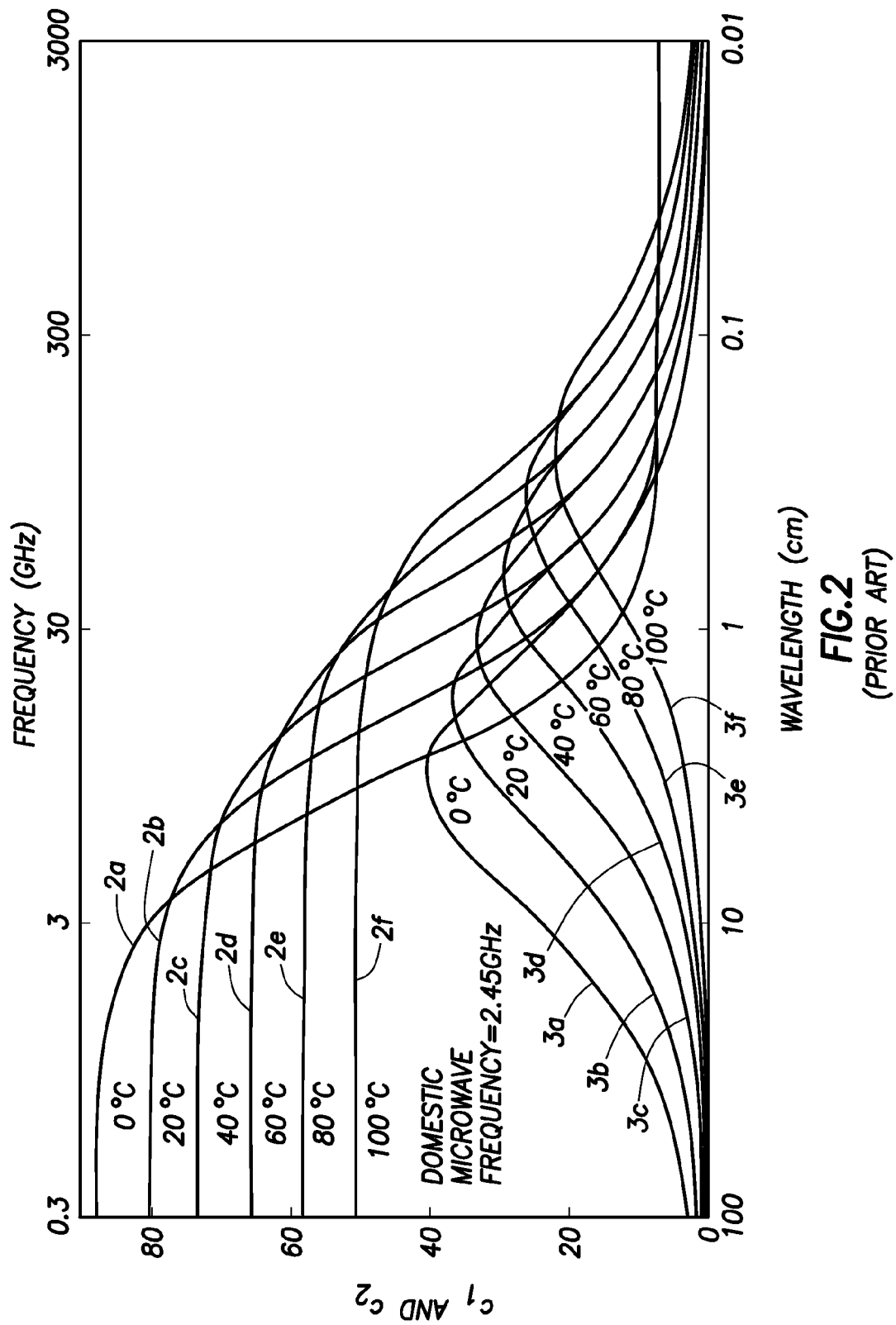
FIG. 2 is an example graph illustrating the variations of the complex permittivity of pure water with frequency or wavelength for a plurality of temperatures.

FIG. 2 (prior art) relates to the behavior of fresh water. The complex relative electric permittivity $\in^* = \in_1 - i\in_2$ varies, as shown in the graph of FIG. 2, with temperature in response to the energy required to break intermolecular hydrogen bonds, which decreases with increasing temperature. The real part of the complex relative electric permittivity $\in_1$, which may depend on frequency, may be referred to as the dielectric constant. The imaginary part of the complex relative electric permittivity $\in_2$, accounts for electrical dissipation within the dielectric fluid. In FIG. 2, curves 2a, 2b, 2c, 2d, 2e and 2f correspond to the real part of the complex relative electric as a function of frequency and/or wavelength in water, and measured respectively at temperatures t=0° C., t=20° C., t=40° C., t=60° C., t=80° C., t=100° C. Similarly, curves 3a, 3b, 3c, 3d, 3e and 3f correspond to the imaginary part of the complex relative electric as a function of frequency and/or wavelength in water, and measured respectively at temperatures t=0° C., t=20° C., t=40° C., t=60° C., t=80° C., t=100° C.

As is apparent in FIG. 2, the temperature changes result in the following: (1) a decrease in both the static and optical dielectric constants with temperature; (2) an oscillation of water molecules enabled at higher frequencies as temperature increases; and (3) a reduction of the rotation drag of the water molecules with temperature, thereby reducing the friction and resulting dielectric loss. The high frequency limit of the complex relative electric permittivity $\in_\infty$ does not change significantly with temperature. The majority of the dielectric loss arises at frequencies from 1 to 300 GHz with a maximum at about 100 GHz.

This graph may be used to select an operating frequency of a microwave heater. For example, microwave ovens that are used to heat food, for example, operate at a frequency of about 2.6 GHz, so that the electromagnetic radiation may penetrate without total adsorption by any outer layer of water, resulting in even heating of the food. In the case of food heating, any unabsorbed electromagnetic radiation that passes through the food sample is reflected by a metallic wall in the oven and further traverses the food sample to be absorbed.

Figure 3:
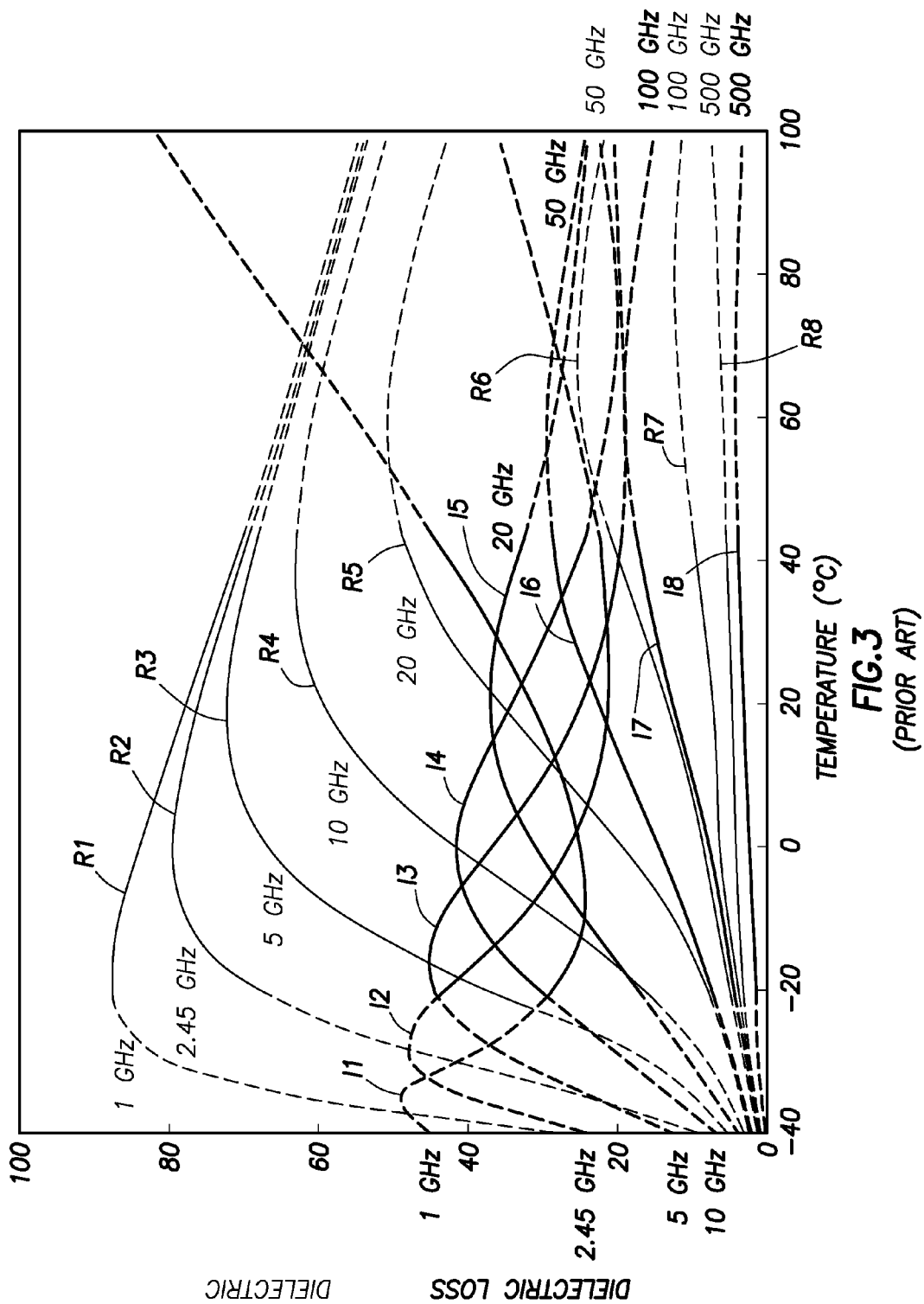
FIG. 3 is an example graph illustrating the variations of real and imaginary parts of the complex electric permittivity of saline water with temperature at a plurality of frequencies.
Figure 4:
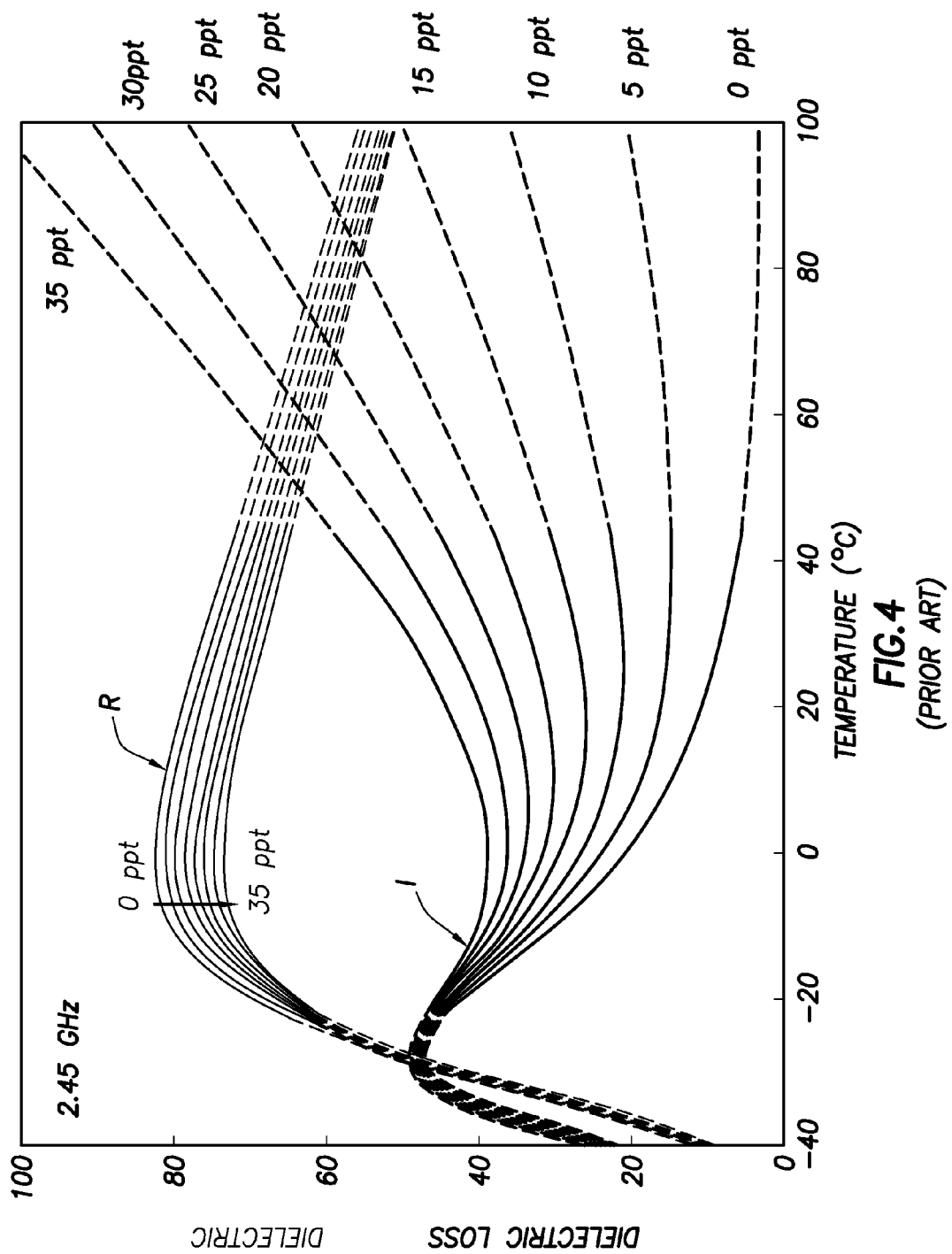
FIG. 4 is an example graph illustrating the variations of real and imaginary parts of the complex electric permittivity with temperature of a plurality of water samples having different salinities.

Underground water is however usually saline. FIGS. 3 and 4, reproduced from http://www.lsbu.ac.uk/water/microwave.html, illustrate the effect of a dissolved salt in the water on the complex dielectric permittivity.

FIG. 3 (prior art) shows a graph of the real (R) and imaginary (I) components, respectively, of the complex dielectric permittivity for water having a sodium chloride (NaCl) concentration of 10 parts per thousands (ppt) for electromagnetic energy frequencies of 1 GHz (curves R1, I1), 2.45 GHz (curves R2, I2), 5 GHz (curves R3, I3), 10 GHz (curves R4, I4), 20 GHz (curves R5, I5), 50 GHz (curves R6, I6), 100 GHz (curves R7, I7) and 500 GHz (curves R8, I8).

As shown in FIG. 3, when water contains salt, for example, sodium chloride (NaCl), the hydrogen bonding between water molecules is disrupted and the static dielectric constant decreases. At lower electromagnetic energy frequencies the ions in an aqueous solution are able to respond and move with changes in applied electric potential and produce heat from friction. Therefore, in salt water the electromagnetic energy absorption increases with increasing temperature. Such response is in direct proportion to the dielectric loss and inversely proportional to the product of density and heat capacity, both of which vary less with temperature than does the dielectric constant.

FIG. 4 (prior art) shows a graph of real and imaginary parts of the complex electric permittivity at a frequency of 2.45 GHz, for a range of salinities from zero to 35 ppt. FIG. 4 suggests two important features. First is that the rate of change of the real part of the complex permittivity (i.e., the dielectric constant) with temperature is almost independent of both temperature and salinity within the temperature range from 0 to 100° C. (such temperature range includes the majority of heavy oil reservoirs, and includes, in many cases, the temperature increment adequate to mobilize heavy oil using the heating techniques described herein). Thus, it may be possible to determine a temperature variation from a measurement of the real part of the complex permittivity. Second is that there is a large and easily measured variation in the imaginary part of the complex permittivity (i.e., the dielectric loss) at high temperatures. Such variation may be used to estimate the salinity, which may then be used to decrease the systematic error in the determination of temperature from a measurement of the real part of the complex permittivity.

Figure 5:
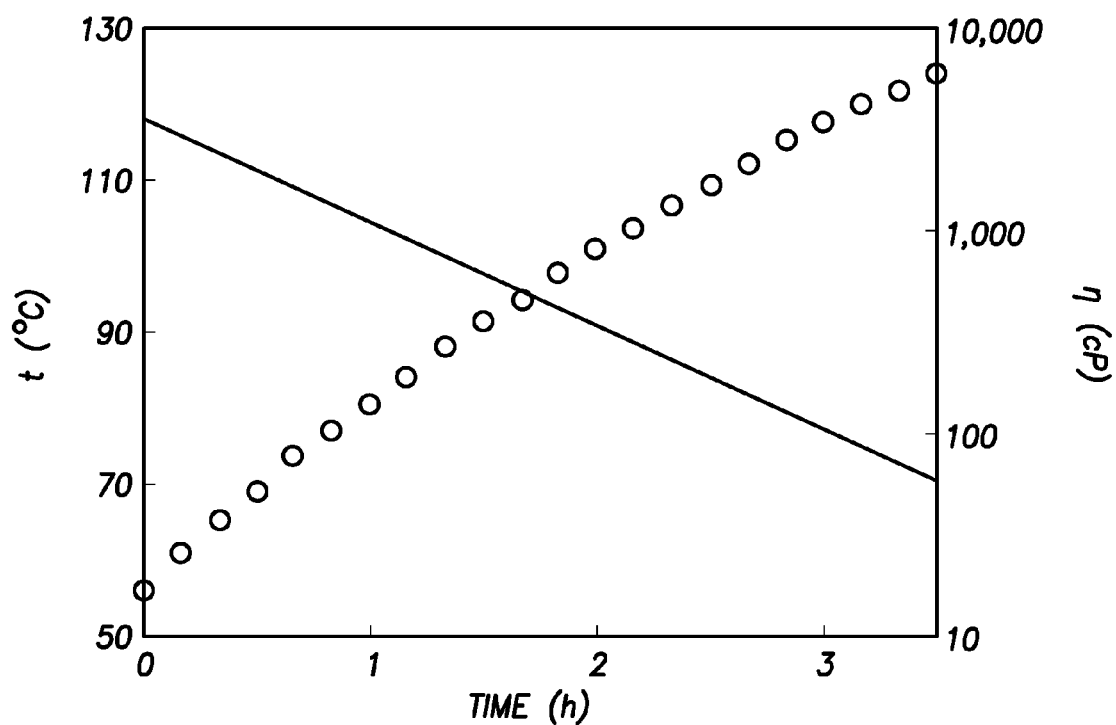
FIG. 5 is an example graph illustrating experimental results obtained in a laboratory when heating a formation with an electromagnetic emitter.

Turning now to FIG. 5, experimental results obtained in a laboratory are presented. The graph of FIG. 5 shows the average temperature (open circles) of unconsolidated laboratory "formation" exposed to an electromagnetic energy as a function of heating time.

In this experiment, the electromagnetic source has a power of about 1 kW, and is configured to radiate electromagnetic energy at a frequency of about 2.45 GHz. As shown in FIG. 2, water at room temperature exhibits a large relative dielectric constant and a noticeable absorption at the frequency of 2.45 GHz. In contrast, the complex relative dielectric constant of hydrocarbons is much less than of water in this frequency range, varying between 2 and 3. Thus, as compared with water, oil is relatively transparent to electromagnetic energy at 2.45 GHz, and does not absorb significant energy at such frequency.

In this experiment, the laboratory formation is formed from a mixture of sand, oil and water, having a total volume of about 50 dm$^3$. The laboratory formation porosity is approximately 35%. The laboratory formation fluid contains 95% oil (that is about 16.5 dm$^3$ of oil) and 5% water. While no viscosity has been measured, a viscosity curve for a Venezuelan crude oil (solid line) has been computed from the measured temperature.

The results illustrated in FIG. 5 show that a volume of 50 dm$^3$ may be heated to achieve a temperature increment of 30° C. using a 1 kW microwave source operated for a time on the order of one hour. By extrapolation, these results suggest that 15 dm$^3$ of formation may be heated to achieve a temperature increment of 100 C using a 1 kW microwave source in a time on the order of one hour.

Turning now to FIGS. 6-18, methods and apparatuses according to one or more aspects of the present disclosure includes lowering a downhole tool or similar instrument into a wellbore drilled through the particular formations intended to have samples of fluid withdrawn therefrom. The downhole tool may be placed in contact with the wall of the wellbore by any eccentering device known in the art. Electromagnetic energy is emitted from a device inside the downhole tool. The electromagnetic energy has a frequency selected to heat water in the formations (connate or residual water, injected water, water based mud filtrate, etc). Such heat may be transferred to the hydrocarbon in the formations by convection and/or conduction. The heating continues until the hydrocarbon is sufficiently mobilized to be extracted from the formation by a formation sample taking device. In some examples, the frequency is about 1 GHz. In some examples, the frequency is selected such that hydrocarbon is substantially transparent to the electromagnetic energy.

The heating methods and apparatus of the present disclosure may be most effective if water is interspersed with the hydrocarbon, for example, combined within the same pore spaces. Thus, the heating methods and apparatus of the present disclosure may involve determining a water saturation in the formation for selecting sampling stations along a wellbore drilled through the reservoir and/or actuating a selected set from a plurality of electromagnetic emitters conveyed in a downhole tool.

The heating methods and apparatus of the present disclosure may involve temperature control, for example, with active feedback. First, to minimize or avoid changing the chemical composition of the hydrocarbon fluid, the temperature that the hydrocarbon fluid is heated to may be controlled below a decomposition (cracking) temperature and/or a phase transition temperature. For example, the cracking temperature is generally believed to be below about 600° C. This former limitation may define an upper limit on the temperature increase. Second, to facilitate the flow of withdrawn hydrocarbon into and/or the sampling tool, the temperature that the hydrocarbon fluid is heated to may be controlled above a temperature at which the hydrocarbon exhibits a threshold mobility. For example, the withdrawn hydrocarbon may block hydraulic passages within the sampling tool, which interconnect a sample probe (in contact with the formation) with a sample storage chamber in the tool, especially if the fluid cools during movement through the tool and again becomes viscous. This latter limitation may define a lower limit on the temperature increase.

Alternatively or additionally, the heating methods and apparatus of the present disclosure may involve measuring the hydrocarbon viscosity or mobility, a physical property altered by the electromagnetic emission. The hydrocarbon viscosity may be estimated, for example, by measuring a viscosity related parameter such as nuclear a magnetic resonance (NMR) relaxation time. Alternatively, pretests may be performed.

The methods and instruments described therein may enable the characterization of hydrocarbon production from heavy oil and bitumen bearing rock formations using wellbore conveyed instruments, thus avoiding or reducing the need for expensive, time consuming production testing.

Figure 6:
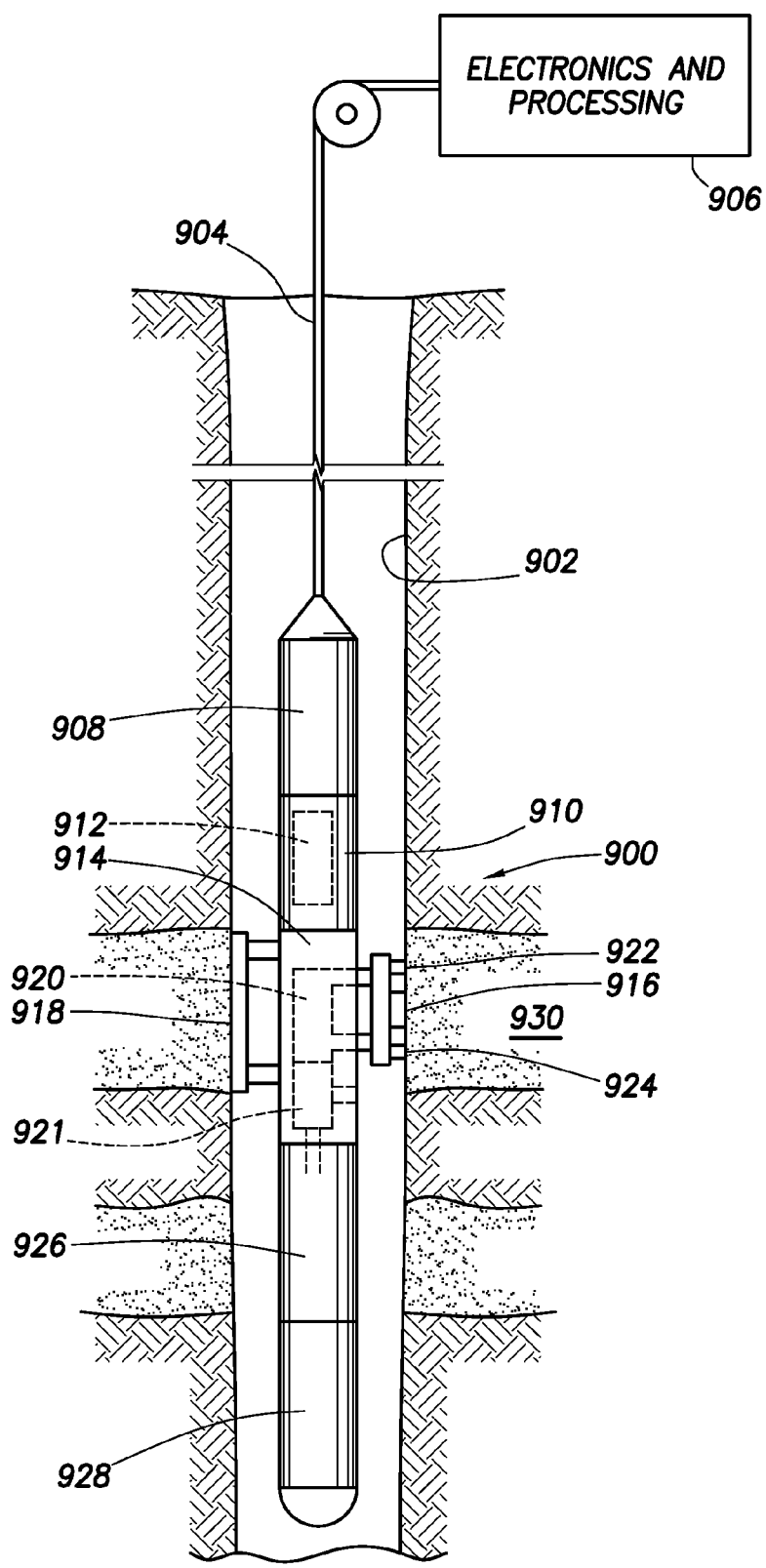
FIG. 6 is an elevational view of a sampling tool according to one or more aspects of the present application.

Referring to FIG. 6, an example wireline instrument 900 is shown that may be used to implement one or more aspects of the present disclosure. In particular, the wireline instrument may be configured to heat a portion of a formation 930 and extract formation fluid samples therefrom.

The example wireline instrument 900 may be suspended in a wellbore 902 from the lower end of a multiconductor cable 904 that is spooled on a winch (not shown) at the Earth's surface. At the surface, the cable 904 is communicatively coupled to an electronics and processing system 906. The electronics and processing system 906 may include a controller having an interface configured to receive commands from a surface operator. In some cases, electronics and processing system 906 may further include a processor configured to implement one or more aspects of the methods described herein. The example wireline instrument 900 includes an elongated body 908 that may include a telemetry module 910, and a formation tester 914. Although the telemetry module 910 is shown as being implemented separate from the formation tester 914, in some example implementations, the telemetry module 910 may be implemented in the formation tester 914. Further, additional components may also be included in the instrument 900.

The formation tester 914 may comprise a selectively extendable fluid admitting assembly 916 and a selectively extendable tool anchoring member 918 that are respectively arranged on opposite sides of the body 908. The fluid admitting assembly 916 is configured to selectively seal off or isolate selected portions of the wall of the wellbore 902 to fluidly couple to the adjacent formation 930 and draw fluid samples from the formation 930 using for example a pump 921. In the illustrated example, the fluid admitting assembly 916 is provided with a plurality of heat sources 922, 924 disposed adjacent to an inlet of the fluid admitting assembly 916, and configured to heat a portion of the formation 930 proximate the fluid admitting assembly 916. The formation tester 914 may also include a fluid analysis module 920 through which the obtained fluid samples flow. The fluid may thereafter be expelled through a port (not shown) or it may be sent to one or more fluid collecting chambers 922 and 924, which may receive and retain the formation fluid for subsequent testing at the surface or a testing facility.

The telemetry module 910 may comprise a downhole control system 912 communicatively coupled to the electrical control and data acquisition system 906. In the illustrated example, the electrical control and data acquisition system 906 and/or the downhole control system 912 may be configured to control the fluid admitting assembly 916 and/or the extraction of fluid samples from the formation 930, for example the pumping rate of pump 921. The electrical control and data acquisition system 906 and/or the downhole control system 912 may further be configured to control one or more of the heat sources 922 and 924, as further described herein. The electrical control and data acquisition system 906 and/or the downhole control system 912 may still further be configured to analyze and/or process data obtained, for example, from fluid analysis module 920 or other downhole sensors (not shown), store and/or communicate measurement or processed data to the surface for subsequent analysis.

Figure 7A:
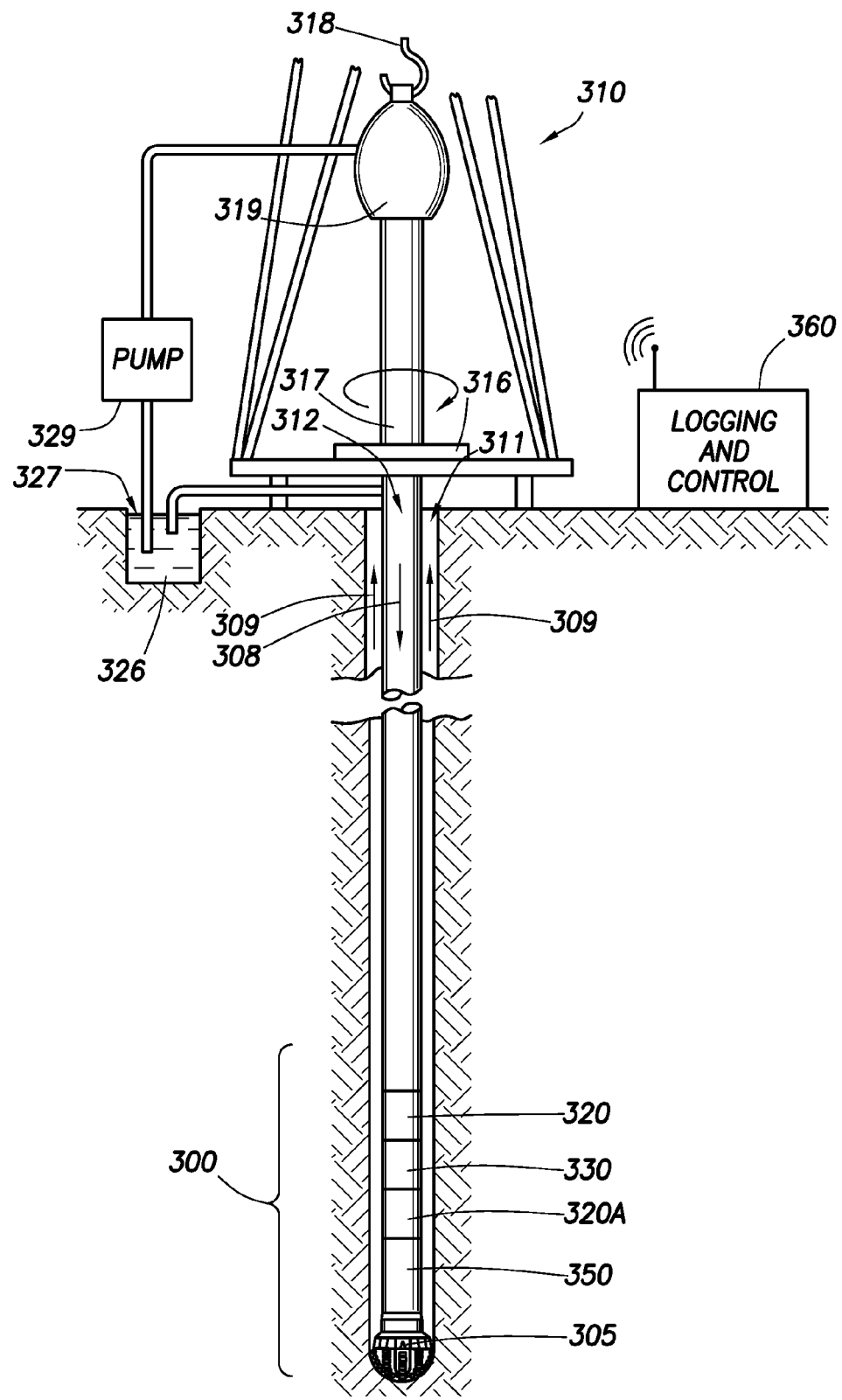
FIG. 7A is an elevational view of another sampling tool according to one or more aspects of the present application.
Figure 7B:
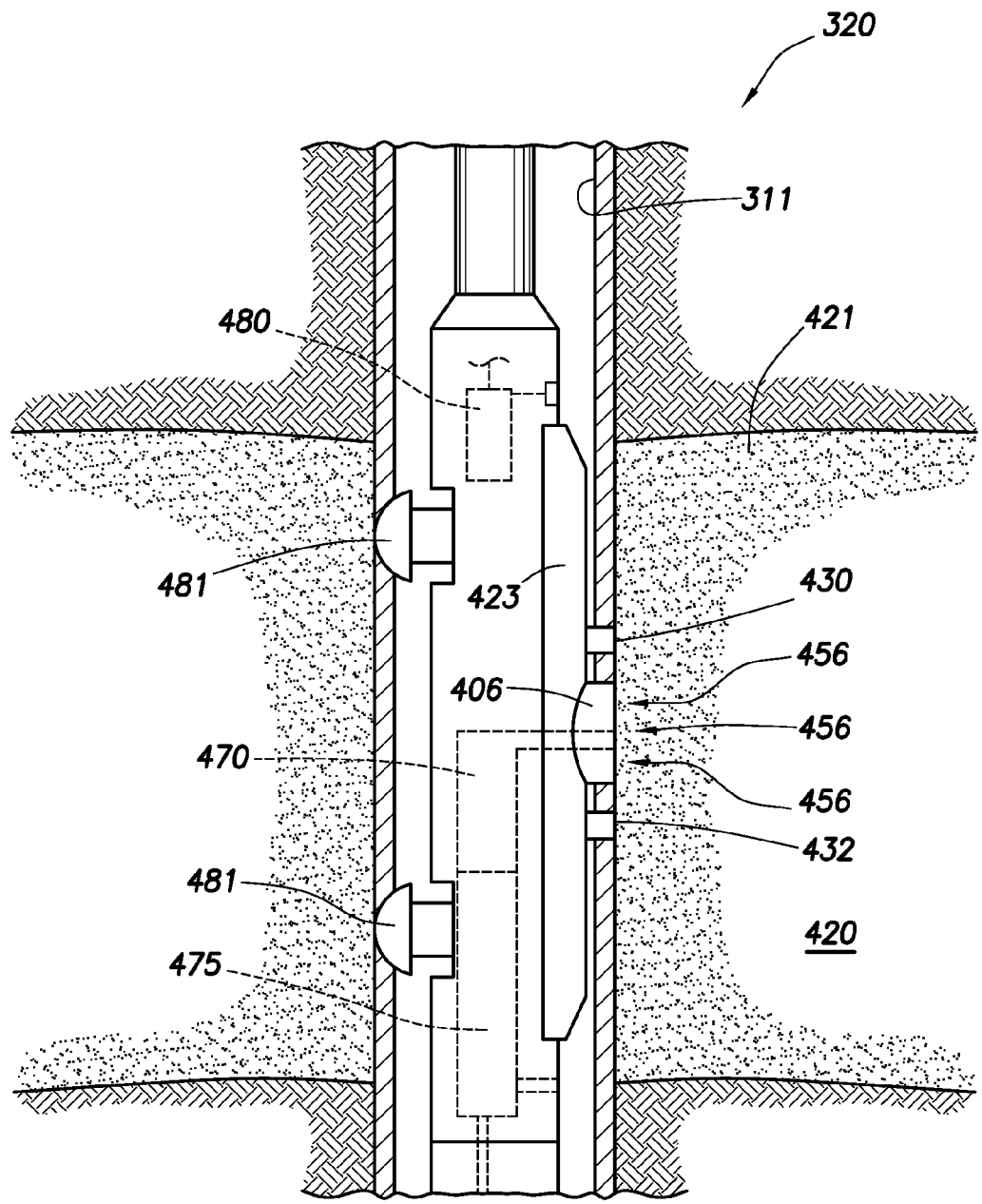
FIG. 7B is an elevational view of a portion of the downhole tool shown in FIG. 7A.

Referring to FIGS. 7A and 7B, an example wellsite system is shown that may be used to implement one or more aspects of the present disclosure. In particular, the wellsite system may be used to heat a portion of a formation and extract formation fluid samples therefrom. The wellsite may be situated onshore (as shown) or offshore.

In the system of FIG. 7A, a wellbore 311 is drilled through subsurface formations by rotary drilling in a manner that is well known in the art. However, the present disclosure also contemplates others examples used in connection with directional drilling apparatus and methods, as will be described hereinafter.

A drill string 312 is suspended within the wellbore 311 and includes a bottom hole assembly ("BHA") 300 proximate the lower end thereof. The BHA 300 includes a drill bit 305 at its lower end. The surface portion of the wellsite system includes platform and derrick assembly 310 positioned over the wellbore 311, the assembly 310 including a rotary table 316, kelly 317, hook 318 and rotary swivel 319. The drill string 312 is rotated by the rotary table 316, which is itself operated by well known means not shown in the drawing. The rotary table 316 engages the kelly 317 at the upper end of the drill string 312. The drill string 312 is suspended from the hook 318. The hook 318 is attached to a traveling block (also not shown), through the kelly 317 and the rotary swivel 319 which permits rotation of the drill string 312 relative to the hook 318. As is well known, a top drive system (not shown) could alternatively be used instead of the kelly 317 and rotary table 316 to rotate the drill string 312 from the surface.

In the example of FIG. 7A, the surface system further includes drilling fluid ("mud") 326 stored in a tank or pit 327 formed at the wellsite. A pump 329 delivers the drilling fluid 326 to the interior of the drill string 312 via a port in the swivel 319, causing the drilling fluid 326 to flow downwardly through the drill string 312 as indicated by the directional arrow 308. The drilling fluid 326 exits the drill string 312 via water courses, or nozzles ("jets") in the drill bit 305, and then circulates upwardly through the annulus region between the outside of the drill string and the wall of the borehole, as indicated by the directional arrows 309. In this well known manner, the drilling fluid 326 lubricates the drill bit 305 and carries formation cuttings up to the surface, whereupon the drilling fluid 326 is cleaned and returned to the pit 327 for recirculation. It should be noted that in some implementations, the drill bit 305 may be omitted and the bottom hole assembly 300 is conveyed via tubing.

The bottom hole assembly 300 of the illustrated example may include a logging-while-drilling (LWD) module 320, a measuring-while-drilling (MWD) module 330, a roto-steerable directional drilling system and hydraulically operated motor, and the drill bit 305.

The LWD module 320 is housed in a special type of drill collar, as is known in the art, and may contain one or a plurality of known types of well logging instruments. It will also be understood that more than one LWD module may be employed, e.g. as represented at 320A. (References, throughout, to a module at the position of LWD module 320 may alternatively mean a module at the position of LWD module 320A as well.) The LWD module 320 typically includes capabilities for measuring, processing, and storing information, as well as for communicating with the MWD 330. In particular, the LWD module 230 may include a processor configured to implement one or more aspects of the methods described herein. In the present embodiment, the LWD module 320 includes a fluid sampling device as will be further explained below.

The MWD module 330 is also housed in a special type of drill collar, as is known in the art, and may contain one or more devices for measuring characteristics of the drill string and drill bit. The MWD module 330 further includes an apparatus (not shown) for generating electrical power for the downhole portion of the wellsite system. Such apparatus typically includes a turbine generator powered by the flow of the drilling fluid 326, it being understood that other power and/or battery systems may be used while remaining within the scope of the present disclosure. In the present example, the MWD 330 module may include one or more of the following types of measuring devices: a weight-on-bit measuring device, a torque measuring device, a vibration measuring device, a shock measuring device, a stick slip measuring device, a direction measuring device, and an inclination measuring device. The MWD module 330 typically includes capabilities for measuring, processing, and storing information, as well as for communicating with a logging and control unit 360. In some cases, the logging and control unit 360 may include a controller having an interface configured to receive commands from a surface operator.

A simplified diagram of a sampling-while-drilling logging device (e.g. the LWD tool 320 in FIG. 7A) is shown in FIG. 7B. The sampling-while-drilling logging device of FIG. 7B may be of a type described, for example, in U.S. Patent Application Publication No. 2008/0156486, incorporated herein by reference. However, other types of sampling-while-drilling logging devices may be used to implement the LWD tool 320 or part of an LWD tool.

As shown in FIG. 7B, the LWD tool 320 is provided with a stabilizer that may include one or more blades 423 configured to engage a wall of the borehole 311. The LWD tool 320 may be provided with a plurality of backup pistons 481 to assist in applying a force to push and/or move the LWD tool 320 against the wall of the borehole 311.

A probe 406 may extend from the stabilizer blade 423 of the LWD tool 320. The probe 406 may be configured to selectively seal off or isolate selected portions of the wall of the wellbore 311 to fluidly couple to an adjacent formation 420. Once the probe 406 fluidly couple to the adjacent formation 420, various measurements may be conducted on the sample such as, for example, a pretest parameter or a pressure parameter may be measured. Also, a pump 475 may be used to draw fluid 421 from the formation 420 into the LWD tool 320 in a direction generally indicated by arrows 456. The fluid may thereafter be expelled through a port (not shown) or it may be sent to one or more fluid collecting chambers (not shown), which may receive and retain the formation fluid for subsequent testing at the surface or a testing facility. Optionally, the LWD tool 320 may includes a fluid analysis module 470 through which the obtained fluid samples flow and configured to measure properties of the fluid extracted from the formation 420.

In the example of FIG. 7B, the blade 423 may be provided with a plurality of heat sources 430, 432, further described below. The heat sources 430, 432 may be disposed adjacent to an inlet of the probe 406, and configured to heat a portion of the formation 420 proximate the probe 406.

Still in the example of FIG. 7B, a downhole control system 480 is configured to control the operations of the LWD module 320. In particular, the downhole control system 480 may be configured to control the extraction of fluid samples from the formation 420, for example, via the pumping rate of pump 475. The downhole control system 480 may further be configured to control one or more of the heat sources 430 and 432, as further described herein. The downhole control system 480 may still further be configured to analyze and/or process data obtained, for example, from fluid analysis module 470 or other downhole sensors (not shown), store and/or communicate measurement or processed data to the surface for subsequent analysis. In particular, the downhole control system 480 may include a processor configured to implement one or more aspects of the methods described herein.

There may be practical considerations for the use of a formation sampling tools such as illustrated in FIGS. 6, 7A and 7B. For example, the volume of formation that may be heated to sample a volume $V_s$ of fluid may be estimated from an expression such as:

$$V_T = V_S / (\kappa_T \Delta p \phi S_o) \quad (3)$$

where $\phi$ is the fractional volume of pore space of the formation (porosity), $S_o$ is the hydrocarbon saturation (fractional volume of the formation pore space occupied by the hydrocarbon), $\kappa_T$ is the isothermal compressibility, $\Delta p$ is the pressure drop and $V_T$ is the total volume of the rock formation to be heated. For example, a fluid with $\kappa_T = 5 \cdot 10^{-5}$ psi$^{-1}$, $\Delta P = 4$,300 psi, $\phi = 0.28$ and $S_o = 0.5$, equation (3) gives the result that $V_T/V_S = 33$, indicating that a suitable formation volume to be heated may be thirty three times the desired sample volume. Typically, a sample size of $V_S = 0.45$ dm$^3$ of formation fluid is suitable for complete pressure/volume/temperature characterization ("PVT" analysis). Consequently, the formation temperature in about a volume of 15 dm$^3$ may be increased to obtain a sample of 0.45 dm$^3$.

As another practical consideration, downhole sampling tools such as illustrated in FIGS. 6, 7A and 7B may be configured to reduce the time to permit acquiring a fluid sample. Indeed, the time allocated for heating a sufficient volume of formation may be of operational importance. In this case, the method of heating the formation, either surface heating or volumetric heating, may be carefully selected.

Examples of devices for surface heating include resistive heater pads. Surface heating utilizes the thermal diffusivity of the formation to propagate the generated heat. It should be appreciated however that the thermal diffusivity of formations are many orders of magnitude lower than the thermal diffusivity of, for example, metals. Thus, the time adequate for the thermal wave to penetrate the formation sufficiently far into the reservoir to permit the temperature of an adequate volume of fluid to be increased and/or an adequate volume of fluid to be mobilized may be long. For example, when using a resistive heating element positioned on the wellbore wall, mobilizing about 1,000 cm$^3$ of fluid close to a sampling probe while minimizing the thermal degradation of the hydrocarbon may require in some cases the formation to be heated for approximately two days.

Volumetric heating may be performed, for example, by the passage of an electrical current through the formation using two or more electrodes, or inductive sources to provide Joule heating. Another alternative is the use of electromagnetic radiation emitted at one or more frequencies, for example, frequencies tuned to the complex electric permittivity of at least one formation fluid. The latter utilizes properties of the complex electric permittivity of the formation and/or the fluids contained in the formation. The results described in FIG. 5 suggest that volumetric heating provided by electromagnetic radiation emitted at one or more frequencies may be significantly faster than surface heating. Thus, one or more of the heat sources 922, and 924 of FIG. 6 and/or 430, and 432 of FIG. 7B is preferably implemented with a electromagnetic emitter tuned to heat water in the formation. More particularly, the use of electromagnetic energy to heat the connate water may further utilize thermal conduction from the water to the hydrocarbon in order to heat the hydrocarbon. Thus, such methods may be advantageous where water is interspersed with the hydrocarbon in the reservoir, for example, combined within the same pore spaces.

Figure 9:
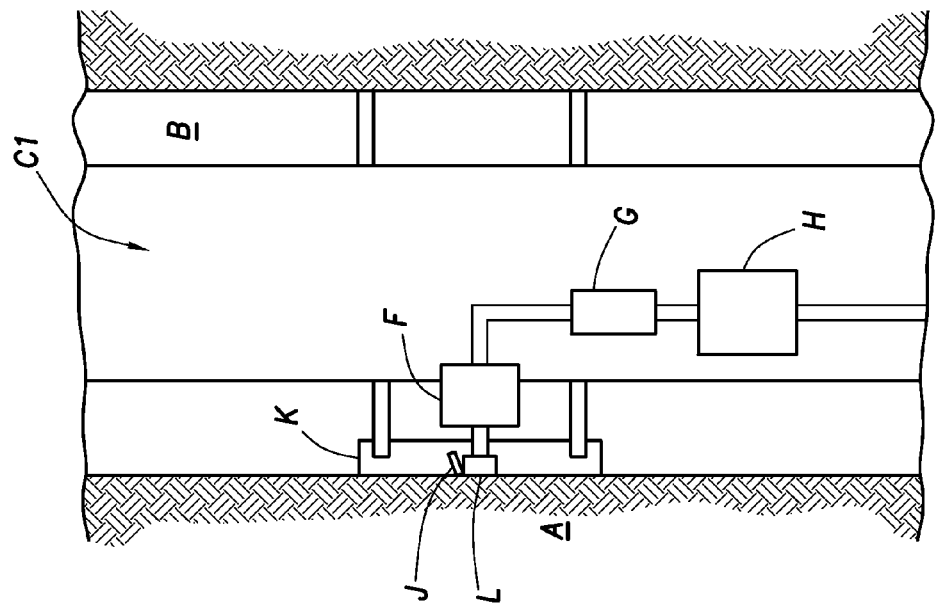
FIG. 9 is a sectional view of another heating tool according to one or more aspects of the present application.
Figure 8:
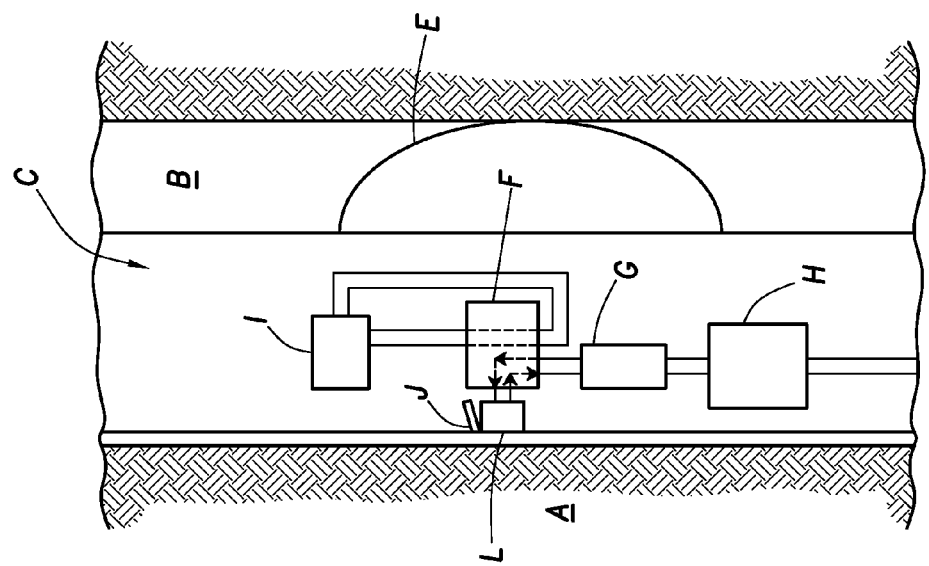
FIG. 8 is a sectional view of a heating tool according to one or more aspects of the present application.

FIGS. 8 and 9 show examples of downhole implementations of electromagnetic emitters configured to heat at least a portion of a formation traversed by a wellbore drilled therethrough. The devices described in FIGS. 8 and 9 may be used, for example, to implement one or more of the heat sources 922, and 924 of FIG. 6 and/or 430, and 432 of FIG. 7B.

Referring to FIG. 8, an example subsurface rock formation, shown at A may contain heavy oil and/or bitumen. A wellbore, shown at B, is drilled through the formation A. A sample heating and extraction tool C may be disposed in the wellbore B within the formation A. A sampling probe assembly configured to sample formation fluid (not shown in FIG. 8) may be located above or below the tool C. The sampling probe (not shown) may be moved to the heated section of the wellbore wall (and thus the formation) A using any positioning devices known in the art. The tool C may be conveyed by any device known in the art for conveyance of instruments through a wellbore, including as non limiting examples armored electrical cable ("wireline"), drill-pipe, coiled tubing, production tubing and slickline. Non-limiting examples of the foregoing conveyance techniques are explained above with reference to FIGS. 6, 7A and 7B.

The tool C preferably includes a magnetron F for generating electromagnetic radiation, and a waveguide L disposed at an output end of the magnetron F. The waveguide L may be configured to pass the electromagnetic radiation from the magnetron F to the formation A. For example, the waveguide L may be filled with a microwave transparent material, such as glass, that may prevent wellbore or other fluid from entering the magnetron F. The magnetron F may be operated using a capacitor (with diode) G, and a transformer H. The capacitor G and transformer H may be capable of providing on the order of 1 kV dc. While the tool C is shown having a magnetron L, other devices could however be used, including a frequency synthesizer and power amplifier.

The magnetron F may be cooled to prevent overheating during operation. Cooling may be provide by either an active device, such as a thermoelectric or Stirling engine shown at I in FIG. 8.

To prevent the temperature of hydrocarbon in the formation A from increasing above a threshold value, the magnetron F may be cycled on and off to control the temperature of the formation at the wellbore wall as determined by a temperature sensor J proximate the wellbore wall. The temperature sensor may be associated with a control such as a programmable microprocessor (see the downhole control system 912 of FIG. 6, and/or the downhole control system 480 of FIG. 7B) that will operate the magnetron F in response to the measured temperature. The temperature sensor J is preferably placed in contact with the wall of the wellbore B and close to the waveguide outlet L of the magnetron F. The temperature sensor J may be a thermocouple or resistance element, for example, and may be housed within a metallic sheath that is grounded to the exterior housing of the tool C. Alternatively, if the fluid disposed in the wellbore B permits infrared sensing, such an infrared sensor may be used to determine the temperature of the formation A near the wall of the wellbore B. Further, the temperature sensor J may be implemented with an antenna configured to detect a signal having characteristics related to a dielectric permittivity of a portion of the formation, and a processor (not shown) configured to determine a parameter indicative of a temperature of the portion of the formation based on the detected signal.

The tool C may be positioned or urged against the formation A (the wellbore wall) so the magnetron output is in contact with the formation A at the wall of the wellbore. Urging or positioning may be performed using any form of biasing device, for example, a bow-spring, shown in FIG. 8 at E, a hydraulic piston and cylinder (not shown), or any other means known in the art for eccentering a tool in a wellbore. Moving the tool C so that a waveguide L disposed at an output end of the magnetron F (or the output end itself) is in contact with the wellbore wall is preferable because if the output end is not in such contact, and water-based drilling or other fluid is disposed in the wellbore, the electromagnetic energy emitted by the magnetron F will be absorbed by such fluid in the wellbore and will not be efficiently communicated to the formations adjacent to the wellbore.

Another example formation heating is shown at C1 in FIG. 9. The example in FIG. 9 may include substantially similar components for heating the formation as shown in the example of FIG. 8, including the magnetron F, capacitor G and transformer H associated with the formation heating tool C1. In the example of FIG. 9, the energy outlet L of the magnetron F may be placed in contact with the formation A by extending a pad K or similar device from the body of the tool C1. Such pad K may be selectably extended by any means known in the art, including as non limiting examples motor/gear assemblies, hydraulic cylinders and springs. In configurations such as the one shown in FIG. 9, it may be possible to cool the magnetron F by passive means, such as using the convection of the fluid in the wellbore B, whereby the cooling device I shown in FIG. 8 may be omitted.

The operating frequency and/or the configuration, amongst other things, of a downhole emitter of electromagnetic energy such as shown by the magnetron F of FIGS. 8 and 9 may be selected to be suitable to heat downhole water (usually saline) and/or providing a sufficient penetration depth in the formation, as further explained below.

A thickness of penetration $\delta$ ("skin depth") of an electromagnetic wave may be defined as the distance at which and emitted wave reaches an amplitude of about 63% of the emitted wave amplitude at the source. The thickness of penetration $\delta$ may be estimated by the expression:

$$\delta = 1/\sqrt{\pi \mu' \sigma' f} \qquad (4)$$

where f is the electromagnetic wave frequency, $\sigma'$ and $\mu'$ are the electrical conductivity and magnetic permeability, respectively, of the substance propagating the electromagnetic energy (i.e. the formation). Equation (4) shows the thickness of penetration $\delta$ of electromagnetic energy decreases according to the square root of the frequency ($f^{1/2}$). Equation (4) may be refined to further include the effect of water conductivity, predicting thereby a lower thickness of penetration $\delta$.

Assuming a particular configuration of the electromagnetic emitter then equation (4) enables the estimation of the operating frequency suitable for radiating into a formation volume of, for example, 15 dm$^3$ (or more generally a volume determined from equation (3)). For example, the particular case when the electromagnetic energy is emitted with an angle of incidence of 45 degrees in the form of a cone with an apex at the outlet of the energy source into a formation may be studied in more details. For a formation with electrical conductivity $\sigma'$=0.01 S/m, the operating frequency is on the order of 0.3 GHz, while for a formation with electrical conductivity $\sigma'$=0.001 S/m, the operating frequency is about 3 GHz. Thus in this configuration, an operating frequency of 0.3 to 3 GHz may generate an electromagnetic wave in the formation that penetrates a sufficient volume of formation to facilitate sampling. It should however be noted than other frequencies may alternatively be used. For example, decreasing the angle of incidence by a factor of 2 decreases the operating frequency by about a factor of 3 for both values of formation conductivity.

In addition, absorbed power P is proportional to the square of the electric field E and to the dielectric loss of the absorbing substance (i.e. the formation water) $\in_2$.

$$P \propto \in_2 E^2 \qquad (5)$$

As apparent in FIG. 3, in mildly saline water, significant dielectric loss occurs at frequencies as low as 1 GHz in a broad temperature range spanning from 40° C. to 100° C., leading to large absorbed power. Thus, an operating frequency of 1 GHz may be adequate for heating underground water in most downhole environments.

It should be noted that below 3 GHz, the complex relative dielectric constant of hydrocarbons is much less than of water. Thus in this frequency range, hydrocarbons are relatively transparent to electromagnetic energy compared with water.

Figure 10:
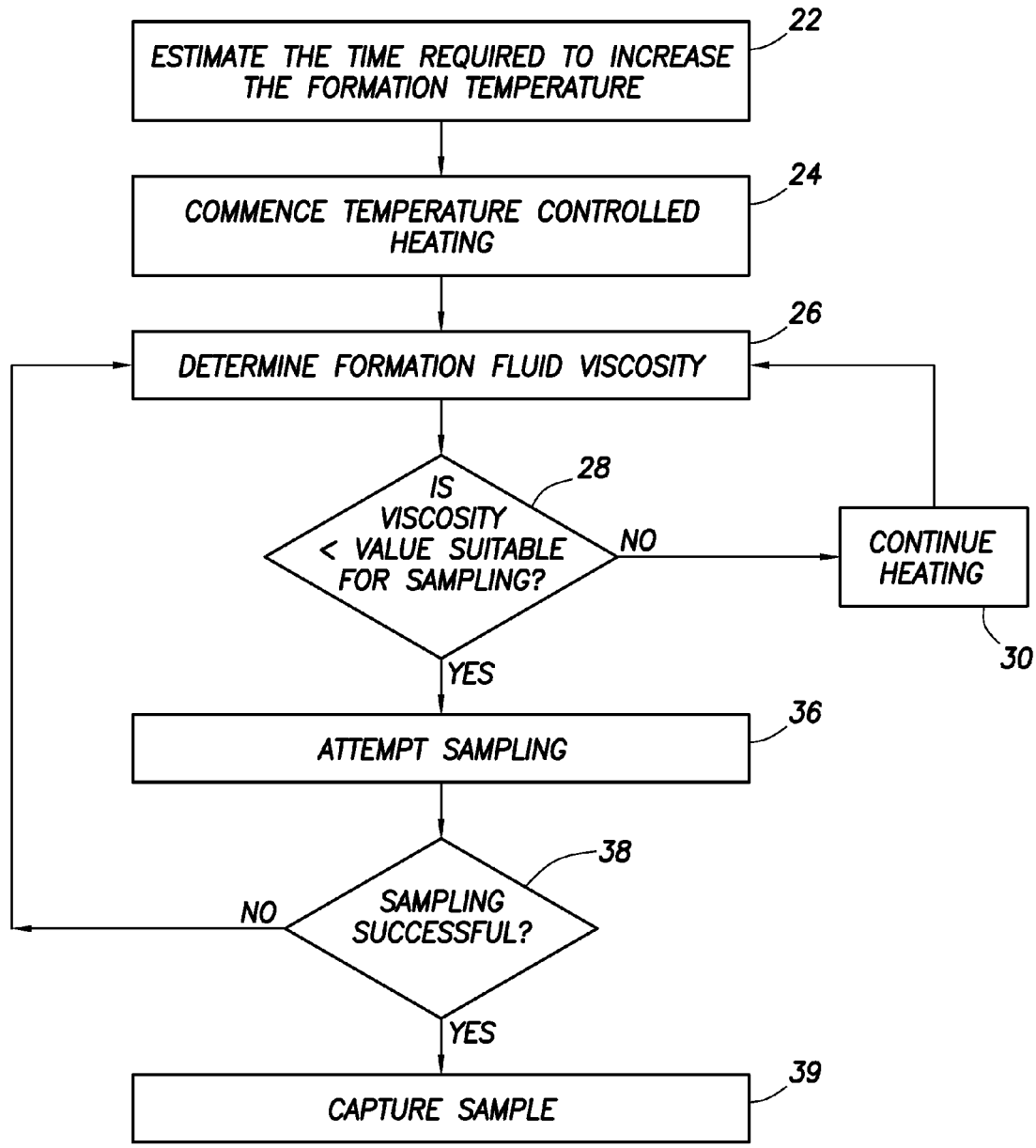
FIG. 10 is a flow chart of a heating and sampling method according to one or more aspects of the present application.

FIG. 10 shows a flow chart describing a method for controlling heating and/or sampling operations of a downhole sampling tool, such as the sampling tools 900 in FIG. 6 and/or the sampling tool 320 in FIG. 7B. In particular, FIG. 10 describes a possible implementation of a process to determine whether sufficient formation heating and resulting viscosity reduction have taken place before initiating formation fluid sampling.

As a practical consideration in the use of a formation sampling tool, it may be desirable that the sampled fluid is capable of flowing through the sampling tool internal passages at an adequate flow rate, for example, no less than about 1 cm$^3$·s$^{-1}$, while maintaining a sufficiently low pressure drop in the formation and/or in the downhole tool. Thus, the foregoing consideration may define a lower bound on the viscosity before sampling is attempted. For example, it may be beneficial to decrease the viscosity of the sampled fluid, for example, to a value in the range between 100 cP and 300 cP or below.

The formation sampling tool is lowered in a wellbore drilled trough a subterranean formation. At step 22, an estimate of the heating time is made. First, an adequate temperature increase may be determined. Using the example of the relationship of viscosity with respect to temperature shown in FIG. 1 a temperature increase of about 100° C. appears to be adequate. It should be noted however that oils may exhibit a relationship of viscosity with respect to temperature different from the relationship shown in FIG. 1, therefore predicting a temperature different from 100° C. Second, a suitable duration during which the electromagnetic energy may be emitted to heat the formation, may be estimated from one or more of laboratory experiments (see for example the description of FIG. 5), the known complex relative electric permittivity of water (see for example FIGS. 2, 3 and 4), determinable thermal propagation in solids and fluids, and the fractional volume of water in the pore spaces of the formation (i.e. the water saturation). However, as a practical matter, one or more of these parameters may not be known. Therefore, the step 22 is optional.

Heating commences at step 24. For example, the emitter magnetron H (in FIGS. 8 and 9) is placed adjacent to a wall of a portion of the formation to be heated and actuated to expose a portion of the formation to electromagnetic energy. The magnetron is preferably configured to heat water in the subsurface formation. For example, the magnetron may emit electromagnetic energy in a portion at one or more frequencies selected in the range between 0.3 to 3 GHz. In particular, the magnetron may emit electromagnetic energy at a frequency on the order of 1 GHz. However, devices other than a magnetron may be used to emit electromagnetic energy into the formation.

At step 26, a parameter related to the viscosity of the formation fluid (and thereby a viscosity of the formation hydrocarbon) is measured. For example, one or more nuclear magnetic resonance (NMR) relation times may be measured, using a logging instrument such as the MRScanner, which is a trademark of Schlumberger Technology Corporation. A viscosity value may then be determined from the one or more measured relaxation times, as known in the art. In another example, a temperature value indicative of the temperature field in the formation is measured. This temperature may be used to determine a viscosity of the formation fluid, using a priori known viscosity curve such as described in FIG. 1. For example, using curve fit parameters representative of the curve shown in FIG. 1, a temperature of about 375° K would predict a viscosity of 100 cP.

At step 28, the determined viscosity may be compared to a viscosity threshold value suitable for successful sampling. If the determined viscosity is below the threshold, a sample attempt may be made at step 36. If the determined viscosity is above the value suitable for sampling, heating may continue at step 30, and the process may be repeated until such time as the viscosity is determined to be less than the threshold.

The viscosity threshold value deemed to be suitable for successful sampling may be estimated so that the pressure drop in the formation and/or in the downhole tool is sufficiently low during sampling. The pressure drop may be limited by one or more of the following considerations:

a. the operating envelope of a sampling pump used in the formation sampling tool to extract formation fluid;
  b. the cross section (e.g. the diameter) of the flow lines or other tubulars in the formation sampling tool;
  c. the probe or packer differential pressure rating;
  d. the ability of the sampled formation to withstand a pressure gradient without excessive damage (e.g. sanding); and
  e. pressure/volume/temperature ("PVT") properties of the sampled fluid, as represented on a phase diagram the phase diagram, such as the bubble point curve, asphaltene precipitation curve, etc. . . .

For illustration purposes, the viscosity threshold value may be a value approximately in the range from 100 cP to 300 cP.

At step 38, a determination of a success of the sample recovery is made. For example, physical properties of a sampled fluid may be measured using a downhole fluid analyzer (e.g., the fluid analysis module 920 in FIG. 6, the fluid analysis module 470 in FIG. 7B) and compared with expected values for the sampled fluid. Alternatively or additionally, a volume of fluid extracted in a sample chamber (e.g., the sample chamber 926 and/or 928 in FIG. 6) may be compared to a volume suitable for PVT analysis, and/or the volume of the chamber. The recovered sample may be deemed to be adequate, if its properties are close to expected values and/or if its volume is sufficient. In this case, the sample may be captured at step 39, for example sealed in the sample chamber. Otherwise, the process may be repeated, optionally at a different location along the wellbore.

Figure 11:
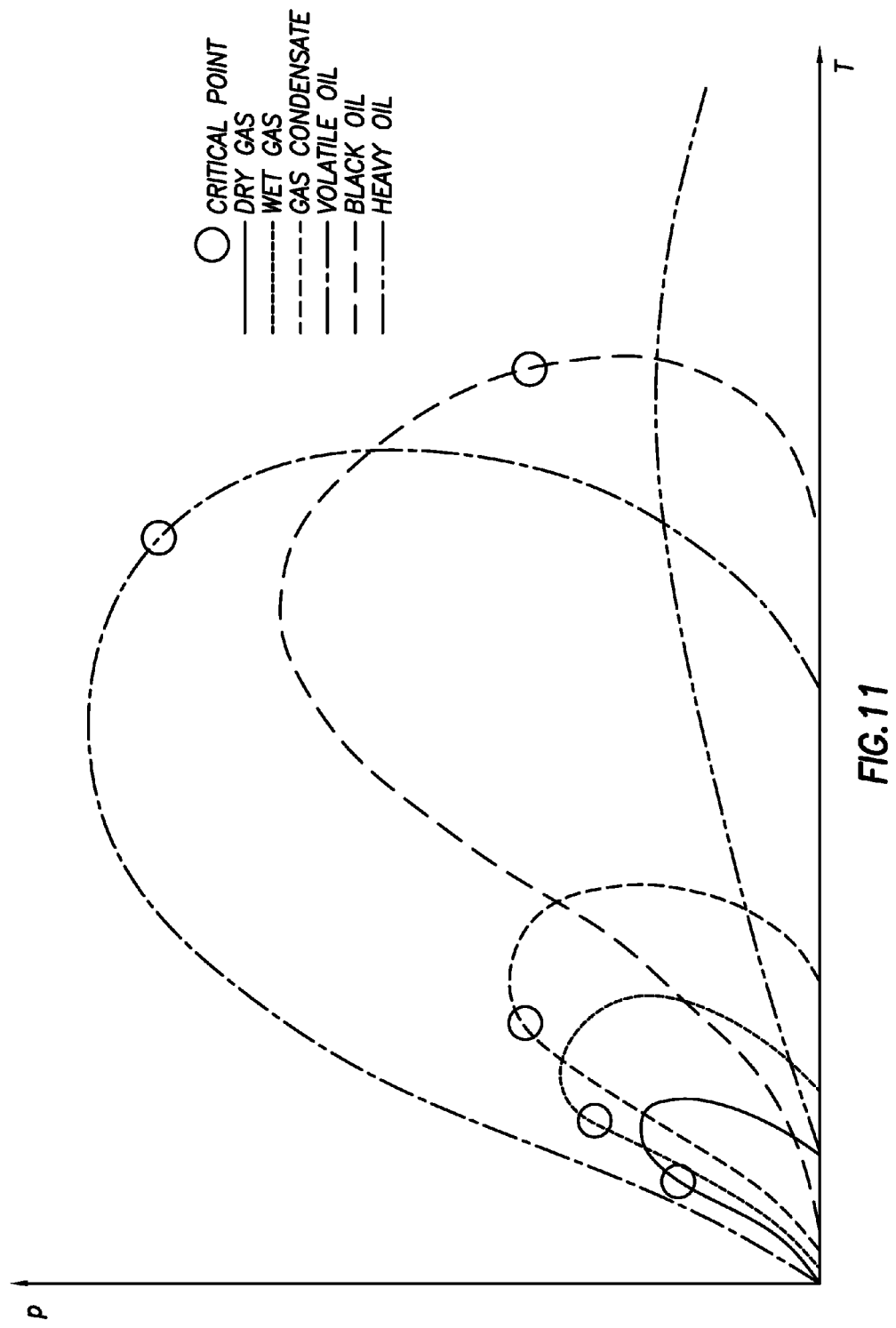
FIG. 11 is an example graph illustrating phase boundaries of a plurality of downhole fluids.
Figure 12A:
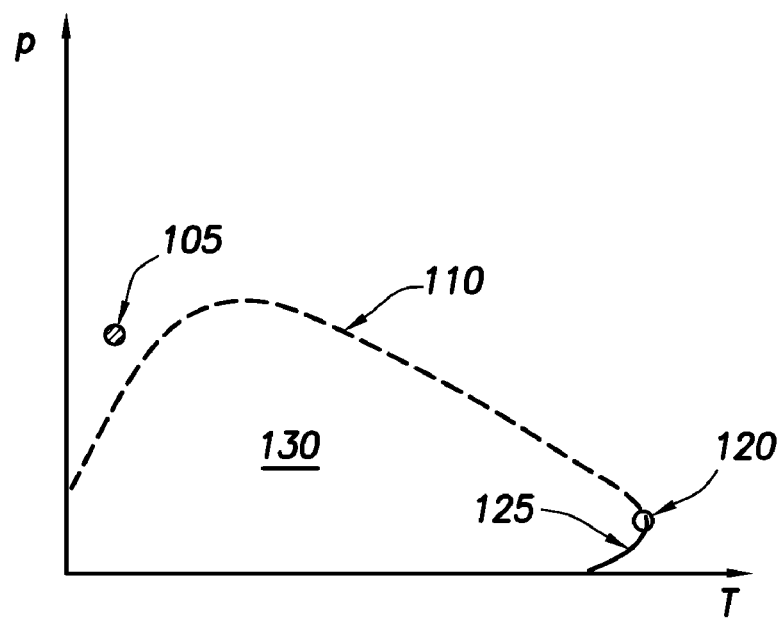
FIG. 12A is an example graph illustrating phase boundaries of heavy oil.
Figure 12B:
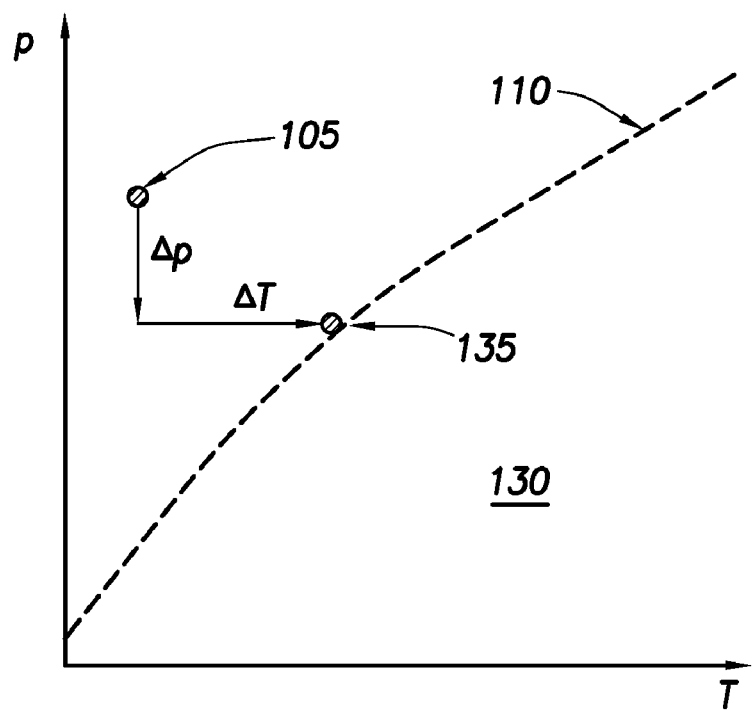
FIG. 12B is an example graph illustrating a portion of the example graph of FIG. 12A.

Turning now to FIGS. 11, 12A, and 12B, graphs depicting phase diagrams of formation fluids as a function of temperature and pressure are depicted. Such graphs may be used to determine a suitable heating temperature of the formation fluid to facilitate sampling, and in particular, to insure that the sampled fluid does not cross a phase boundary during sampling. Thus, a sample representative of the formation fluid may be captured by the formation sampling tool (e.g., the formation sampling tool 900 in FIG. 6 and/or the formation sampling tool 320 in FIGS. 7A and 7B).

Referring to FIG. 11, the variation of thermophysical properties in a pressure and temperature (p, T) diagram for differing hydrocarbon types commonly encountered in subterranean formations is depicted. That is, FIG. 11 is a (p, T) section showing bubble curves and a dew curves (i.e., phase boundaries) for a plurality of reservoir fluids, relative to their respective critical points, at which liquid and gas states are undistinguishable.

In some cases, the bubble curve may commence at temperatures below the critical point temperature, while the dew curve may commence at temperatures above the critical point temperature. In these cases, the dew curve, after increasing, may reach a pressure maximum and then may decrease albeit at pressures lower than the corresponding bubble pressure for the same temperature.

However in other cases, the dew temperatures may occur at temperatures immediately below the critical point temperature, while the bubble curve may commence at temperatures above the critical point temperature. Bitumen is effectively a solid and may not exhibit bubble and/or dew point curves in the pressure and temperature range of interest.

FIG. 12A shows a graph depicting an example of a phase diagram of heavy oil as a function of temperature and pressure. Heavy oil, which may be defined as having a viscosity lower than approximately 10,000 cP, is typically found in unconsolidated formations of permeability on the order of 1 Darcy, at depths usually no more than 2000 m, at reservoir temperatures typically no more than 60° C., and at reservoir pressures of approximately 2,000 psi or lower. In particular FIG. 12A depicts a Venezuelan heavy oil example.

In particular, FIG. 12A shows a pressure (p) and temperature (T) graph indicating the position of the critical point 120, a bubble curve 110, and a dew curve 125. The area 130 located below the bubble curve and the dew curve may define a two phase region 130, at which liquid oil and gas coexist. In addition, the location of the reservoir conditions (point 105) is plotted relative to the fluid phase border. The relative location of the reservoir conditions to the fluid phase border may be used to apply upper limits on both the temperature increment and pressure drop while operating the formation sampling tool describes herein, as described in further details in FIG. 12B.

FIG. 12B shows an enlarged portion of FIG. 12A. As apparent in the example of FIG. 12B, a pressure drop of $\Delta p$ (e.g., 200 psi) and a temperature increase of $\Delta T$ (e.g., 14° C.) with respect to the reservoir conditions corresponds to sampling conditions (point 135) that are not in the two phase region 130, and may therefore be suitable values for controlling the operations of a formation sampling tool. In addition, the viscosity of the heavy oil at sampling conditions (point 135) may be shown to be at most 300 cP, a value suitable for operating a sampling pump at a pressure drop of $\Delta p$.

Figure 13:
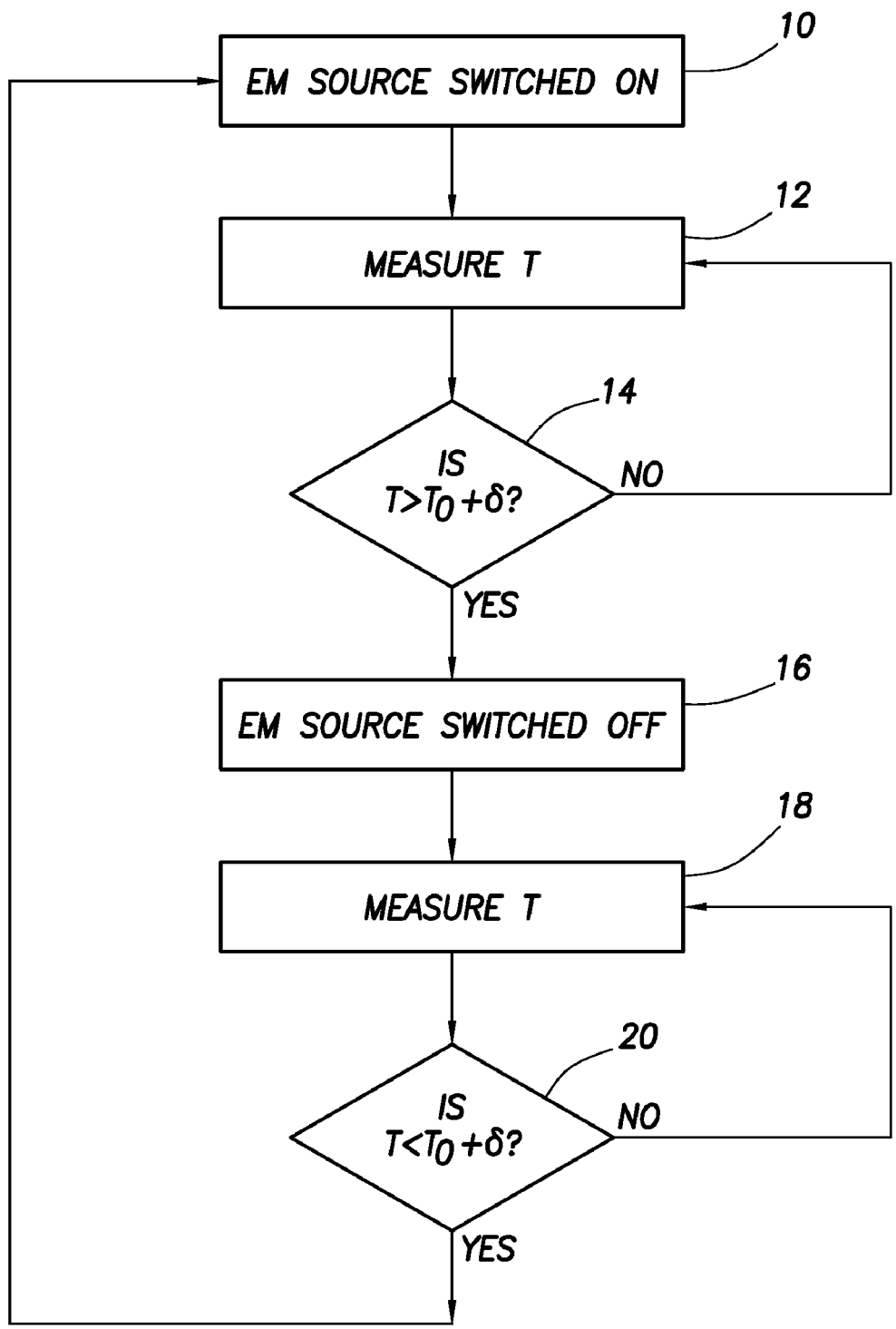
FIG. 13 is a flow chart of a heating method according to one or more aspects of the present application.

Turning now to FIG. 13, a flow chart depicting a method for controlling the temperature of the heated formation is shown. In one example, the temperature of the heated formation, for example as measured by the temperature sensor J in FIGS. 8 and 9, may be limited to a value $T_0$, for example 150° C. Indeed, in a reservoir at a typical temperature of 50° C., containing a heavy oil having an average rate of viscosity change with temperature on the order of 10 cP·C$^{-1}$, a temperature variations not in excess of 100° C. may be sufficient to insure a successful sampling operation.

However, the value $T_0$ may be determined from a priori known phase diagrams to insure single phase sampling, as previously described in FIGS. 11, 12A and 12B. Alternatively or additionally, the value $T_0$ may be determined from a priori known viscosity curve, such as described in FIG. 1, and a viscosity value of the sampled fluid suitable for sampling, such as described in FIG. 10. In particular, the method of FIG. 13 may be used to increase the temperature of the formation within 1 meter of the bore-hole, thereby decreasing the sampled fluid viscosity and therefore, providing adequate formation fluid mobility while maintaining a single phase fluid in the formation and/or in the formation sampling tool.

In the example of FIG. 13, the temperature of the heated formation may be controlled by cycling the electromagnetic source (such as the magnetron F in FIGS. 8 and/or 9) on and off. At step 10, control circuitry (such as controller 912 in FIG. 6 or controller 480 in FIG. 7B) in the tool switches the magnetron on, whereupon electromagnetic energy is emitted into the formation.

At step 12, a temperature T of the formation is measured. In one example, the temperature increase is measured using complex permittivity measurements. In particular, a reference complex permittivity indicative of the formation properties in the volume to be heated is measured prior to heating the formation. A current complex permittivity indicative of the formation properties in the same volume is also measured. A temperature variation is determined from the difference between the real parts of the reference and current complex permittivities, for example by dividing the difference by the nearly constant rate of change of the real part of the complex permittivity as a function of temperature, such as illustrated in FIG. 4. Further, the difference between the imaginary parts of the reference and current complex permittivities, and the determined temperature variation may be used to estimate the salinity of the formation water. In particular, a curve suitable for describing the imaginary part of the complex permittivity variations with respect to temperature may be selected from those examples shown in FIG. 4. The selected curve may correspond to the formation water salinity. Once permittivity curves corresponding to the formation salinity are selected, an absolute formation temperature may also be determined using the selected curve and the current complex permittivity indicative of the formation properties in a heated volume. However, other temperature devices may be used at step 12.

At step 14, the measured temperature T is compared to a limit value $T_0$, plus a permissible tolerance, $\delta$. If the temperature does not exceed the foregoing value, the electromagnetic source remains switched on, and after a selected time the temperature measurement may be repeated at 12. The foregoing cycle may be repeated while the measured temperature does exceed the limit value $T_0$ plus the permissible tolerance $\delta$.

If the measured temperature exceeds the limit value $T_0$ plus the permissible tolerance $\delta$, the electromagnetic source may be switched off at step 16. The temperature measurement may be repeated at step 18. If, at step 20, the temperature remains above the limit value $T_0$ less the tolerance $\delta$, the electromagnetic source may remain switched off, and the temperature measurement at step 18 may be repeated until the temperature falls below the limit value $T_0$ less the tolerance $\delta$, at 20. The electromagnetic source may then be switched on again, at step 10.

Figure 14:
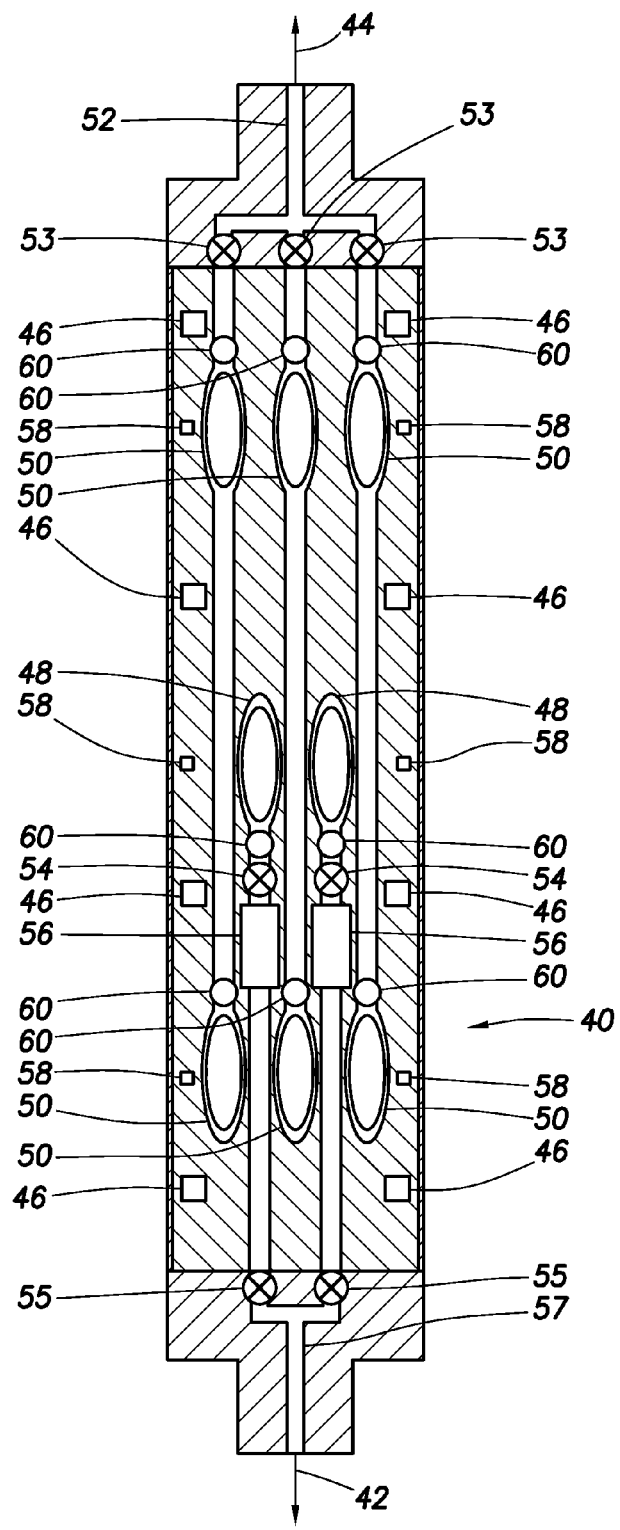
FIG. 14 is a sectional view of a portion of a downhole tool according to one or more aspects of the present application.

Another example instrument referred to as a "single packer" instrument is shown in the sectional view of FIG. 14. FIG. 14 shows elements that may be embedded into the seal or "packer" portion of a wellbore conveyable instrument, and more particularly sample extraction devices and sensors. FIG. 14 omits a number of elements for clarity of the illustration that are well known to those skilled in the art. The exact configuration of the device shown in FIG. 14 may be the same or different than as shown, the figure being only one example of a single packer instrument configuration.

An outer sealing layer 40, such as may be made from an elastomeric material such as rubber is configured to seal and engage the wall of the wellbore. The seal layer 40 may be made to contact the wellbore wall to create a seal, for example by inflation. A plurality of dielectric antennas 46 may be evenly or otherwise spatially distributed in the sealing layer 40 near the outer surface of the sealing layer 40. When operated, the dielectric antennas 46 will be coupled to electric circuits to either: (1) emit RF energy into the formation at a frequency selected as explained herein to heat any water (connate or residual water, injected water, water based mud filtrate) within the pore space of the formation; or (2) to detect RF energy reflected from the formations adjacent to the wellbore. Optionally, a portion of the dielectric antennas may be configured to heat hydrocarbons in the formation (connate hydrocarbon and/or oil based mud filtrate). For example, the portion of the dielectric antenna may be configured for and operated at frequencies corresponding to 40 GHz or above. Suitable circuitry (not shown in FIG. 14) for generating the RF energy may be similar to that shown in FIG. 8 or 9, and may be disposed in a tool mandrel. RF detection circuitry (not shown) for use with the dielectric antennas 46 is well known in the art and will not be further explained herein. For example, one or more RF antenna may be similar to those of the electromagnetic propagation tool EPT, or the Dielectric Scanner, both trademarks of Schlumberger Technology Corporation.

A plurality of "sample" probe opening or drains 48 ("sample drains") may be disposed at selected positions through the sealing layer 40. The sample drains 48 and associated hydraulically connected flow lines 57 in the instrument may be heated such as by electrical resistance heaters (not shown) to maintain the mobility of the fluid after it is withdrawn from the formation or, in other words, to facilitate movement of viscous fluids from the formation by reducing the amount of cooling experienced within the tool and preventing the associated increase in viscosity. The sample drains 48 are selectively exposed by appropriate operation of the valves 55 to differential pressure such as may be provided by a sample extraction pump 42. In particular, the sample drains 48 may be used for withdrawing samples of formation fluid into the sampling tool, for capture and/or analysis. For example, the sample drains 48 may be in hydraulic communication with devices such as sample chambers 56 and isolation valves 54, 55 configured to isolate and capture a formation fluid sample.

A plurality of "guard" probe openings or "drains" 50 may also be disposed at selected positions through the sealing layer 40. The guard drains 50 and associated hydraulically connected flow lines 52 in the instrument may be heated, for example, by electric resistance heating elements (not shown) to maintain mobility of the fluid after it is withdrawn from the formation. When exposed to differential pressure such as may be provided by a guard pump 44, the guard drains 50 may be used to extract mud filtrate from the formation. Thus, the guard drains 50 may be used to cause the connate formation fluid to be withdrawn from the formation in a flow pattern that maximizes the amount of connate fluid flowing through the sample drains 48. As shown in FIG. 14, the sample drains 50 may alternatively be used to inject wellbore fluid (such as water, aqueous based fluid, or other clear fluids) into the formation by reversing a pumping direction of the guard pump 44. In another example, the sampling tool of FIG. 14 may also be configured to inject tool-, tubing- or pipe-conveyed fluids into the formation (not shown).

Flow line sensors 60 may be provided in both the guard drain lines 52 and in the sample drain lines 57. The sensors 60 may include pressure sensors, resistivity sensors, or other flow line sensors known in the art (e.g., dielectric, NMR, etc). The sensors 60 may be used to characterize the properties (e.g., the pressure) and/or the composition (e.g., the proportions of connate fluid and mud filtrate) of the formation fluid being withdrawn. The data provided by the sensors 60 may be used to enable control of the fluid flow pattern from the formation into the tool, for example, via valves 53 and/or 55, or via pumping rates for pumps 42 and/or 44. Further, the data provided by the sensors 60 may be used to monitor the contamination of the fluid extracted through one or more of the sample drains 48 and may be used to determine when to capture a fluid sample in at least one of the chambers 56 by closing at least one of the valves 54. In addition, strain gauges 58, coupled to suitable detection circuitry (not shown) may be spatially distributed evenly or otherwise in the sealing layer 40 to enable determination of the contact pressure of the sealing layer 40 against the wellbore wall. The strain gauges 58 may be used to detect or monitor proper sealing of the sealing layer 40 against a wellbore wall.

Example techniques making use of a device such as shown in FIG. 14 will now be explained with reference to FIGS. 15 through 17. In the present examples, the complex dielectric permittivity of the formation may be measured by using some of the dielectric antennas 46 as electromagnetic energy emitters and using others of the antennas 46 as receivers, as explained above. Because the antennas 46 are spatially distributed in the sealing layer 40, by appropriate selection of particular ones of the antennas 46 to be used as energy emitters and receivers, a complex dielectric permittivity map or image may be determined relative to a lateral position into the formation and away from the wellbore wall, or relative to positions of the drains 48, and/or 50. Since the role of the antennas 46 as emitters and receivers is interchangeable and individually controllable the resolution of the water saturation map may be enhanced by methods well known in the art of tomography. In some examples, a water saturation map or image may be determined (as known in the art) from the complex electric permittivity measurements. Such measurements may be useful in evaluating when and/or where an emitter of electromagnetic energy configured to heat water in the subsurface formation may be actuated, and for adjusting the heating of the formation based on the water saturation map. Such measurements may also be useful in estimating a flow pattern of water in the formation as fluid is extracted, and adjusting sampling operations based on the water flow pattern. In other examples, a formation temperature map or image may be determined (as explained above) from the complex electric permittivity measurements. Such measurements may be useful in evaluating the propagation of heating through the formation, and adjust heating of the formation based on the formation temperature map.

Figure 15:
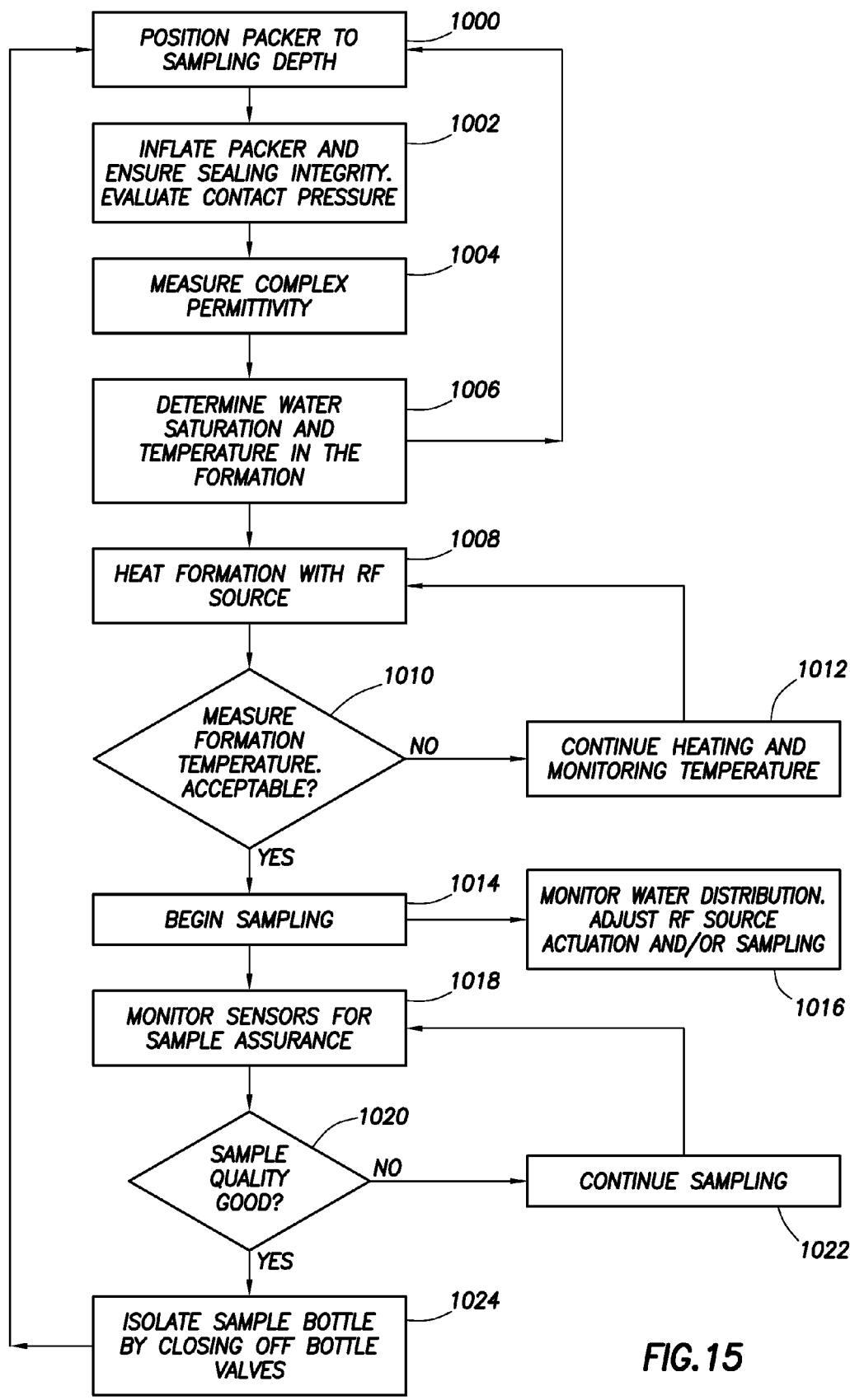
FIG. 15 is a flow chart of another heating and sampling method according to one or more aspects of the present application.

Referring to FIG. 15, the technique first includes at step 1000 positioning the instrument at a selected sample extraction depth. At step 1002, the sealing layer or packer may be inflated, or the sealing layer may be impressed against the wellbore wall. Strain gauges (for example strain gauges 58 in FIG. 14) may be used to detect or monitor proper sealing of the sealing layer 40 against a wellbore wall. If the sealing is deemed inadequate, the sealing layer 40 may be re-inflated or it may be disengaged, moved and inflated at another proximate location.

At step 1004, a complex permittivity map of the formation proximate a sealed portion of the wellbore wall may be measured, using for example some antennas 46 (FIG. 14) as emitters and other antennas 46 as receivers. The lateral displacement (depth) of investigation into the formation may be varied by changing the electromagnetic energy frequency of one or more of the emitter antennas, and/or the spacing between an emitter antenna and an associated receiver antenna. At step 1006, a water saturation map is determined from the complex permittivity map of the formation. In the absence of water (or if the water saturation is below a threshold value), the operating frequency of the RF sources (such as one or more of the antennas 46) used to heat the formation may be changed to excite molecules other than water. For example, the operating frequency may be selected to correspond to 40 GHz or above to heat formation connate hydrocarbons or oil based mud filtrate. Further, in the absence of water (or if the water saturation is below a threshold value), the sampling tool also may be used to inject water into the formation, for example water based mud filtrate. Still further, in the absence of water (or if the water saturation is below a threshold value), the downhole tool may also be positioned at another location in the well.

Also at step 1006, a formation temperature map may be measured, for example using the thermometer J in FIGS. 8 and 9. In some cases, the formation temperature map may be determined (for example as disclosed in the description of FIG. 13) from the complex electric permittivity measurements both with respect to lateral distance into the formation and away from the wellbore wall and with respect to positions of the drains 48, and/or 50.

At step 1008, one or more RF sources (antennas 46 in FIG. 14) are operated as electromagnetic emitters at a frequency as explained herein to heat at least one of formation connate or residual water, injected water, or water based mud filtrate. Optionally, one or more RF sources (antennas 46 in FIG. 14) may be operated as electromagnetic emitters at one or more frequencies of 40 GHz or above, for example to heat formation connate hydrocarbons or oil based mud filtrate. In some cases, only a subset of RF sources capable of efficiently heating water in the formation may be selectively actuated based on the complex electric permittivity measurements and or the water saturation map determined at step 1006. For example, the selected RF sources may be located adjacent to portions of the formation having relatively higher water saturation, and/or may be capable of radiating electromagnetic energy into the portions of the formation having relatively higher water saturation. The selection of a subset of RF sources to be actuated may be advantageous to expedite heating of the formation in the cases the power available downhole is limited.

After the formation heating has been initiated, at step 1010, the temperature in a heated portion of the formation is monitored. For example, the complex permittivity is measured again and the temperature increase is computed from the real component of complex permittivity, optionally with the salinity previously determined at step 1008. If the formation temperature is sufficient, sampling may begin at step 1014. If insufficient heating is determined, at step 1012, heating continues with accompanying temperature monitoring.

At step 1016, the spatial distribution of connate water may be updated during sampling by repeatedly measuring complex permittivity. In some cases, the distribution of antennas (46 in FIG. 14) serving as heating energy emitters may be adjusted based on the updated spatial distribution of connate water to insure efficient heating, for example as explained in the description of step 1008. Also, the sampling operation may be adjusted based on repeatedly measuring complex permittivity. As the water in the formation is being displaced during sampling, the drawdown rate in one or more of tool inlets (such as drains 48 and/or 50 in FIG. 14) may be adjusted to optimize sampling. In one example, a pumping rate (such as the pumping rate of pumps 42 and/or 44 in FIG. 14) may be adjusted to increase the relative amount of formation connate fluid entering a sampling port (such as drains 48 in FIG. 14) and/or decrease the relative amount of wellbore filtrate entering a sampling port. In another example, one or more of the valves 53 and/or 55 may be selectively closed to control the flow pattern of fluids (such as connate fluids, mud filtrate, water, and hydrocarbon) in the formation.

Sensors in the instrument (such as 60 in FIG. 14), in particular in the sample and guard flowlines, may be monitored, at step 1018, to determine the composition and/or the integrity of the sample as it is withdrawn. At 1020, if the sample is determined to be of sufficient quality and/or quantity, the sample chamber (such as chamber 56 in FIG. 14) may be isolated at step 1024, for example by closing one of the pairs of valves 54, 55 (FIG. 14). If the monitored parameters indicate insufficient sample quality and/or quantity, at 1022, sampling may continue with concurrent monitoring at 1018.

Additional samples may be disposed in separate sample chambers by repeating the process beginning at 1000.

Figure 16:
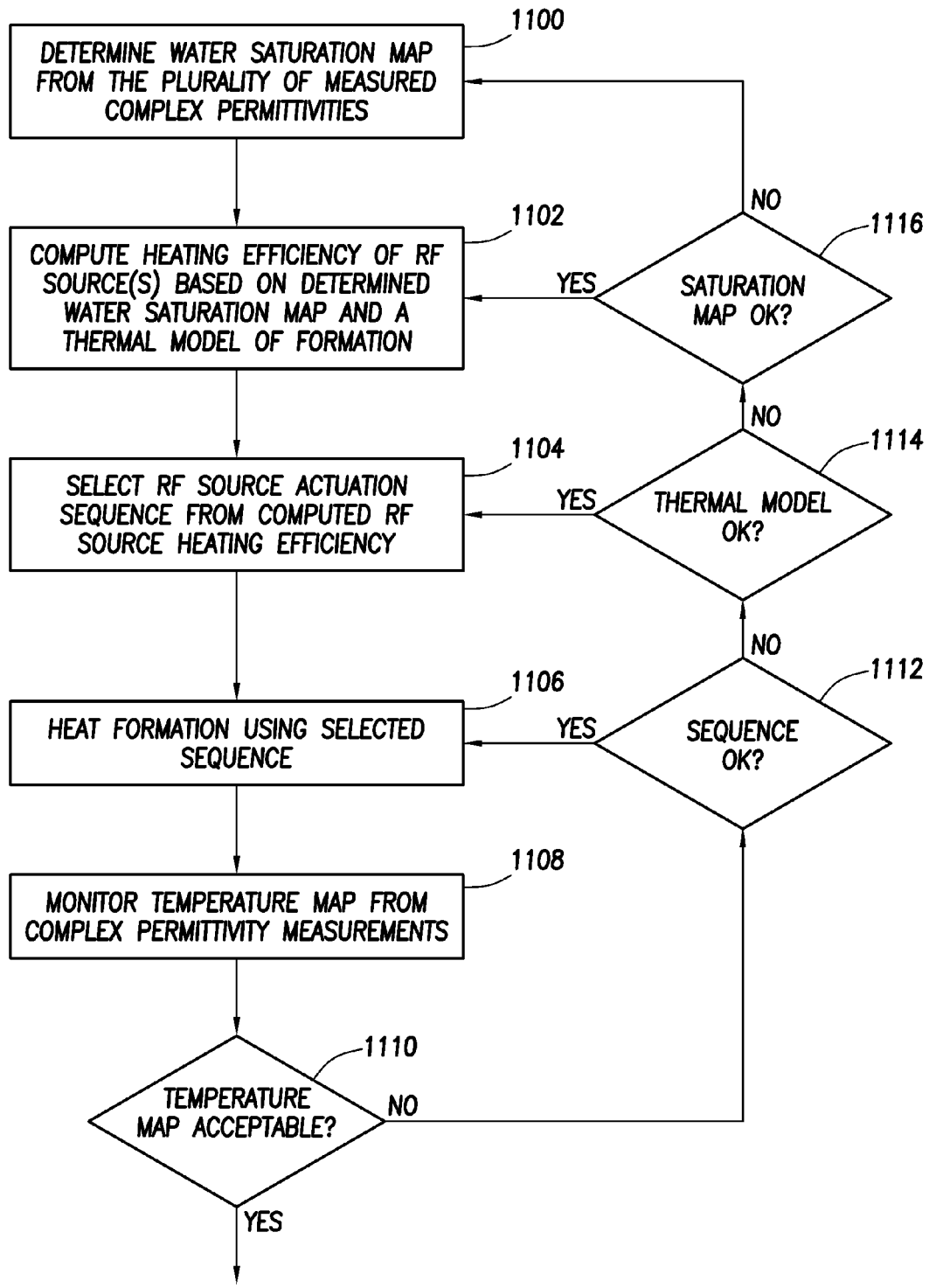
FIG. 16 is a flow chart of another heating method according to one or more aspects of the present application.

Referring to FIG. 16, an example of using spatially distributed temperature and water saturation measurements to optimize heating will be explained. By varying the investigation volume of permittivity measurements, and estimating fractional volume of water in the formation pore space and temperature at selected locations in the formation, particular RF sources (such as dielectric antennas 46 in FIG. 14) may be selected to be used as energy emitters. As water is being displaced in the formation during sampling, the selected emitters may be adjusted, so the formation heating may be optimized during the sampling. The method depicted in FIG. 16 may be used, for example, to implement one or more aspects described in steps 1010, 1012 and 1016 of FIG. 15.

At step 1100, using the spatially distributed emitters and receivers (from selected antennas 46 in FIG. 14) and by making measurements at a plurality of frequencies, a spatial distribution of water saturation (saturation "map") may be determined. Based on which antennas are used as heating energy emitters, it is possible at step 1102 to map the heating efficiency of the various antennas used as electromagnetic energy emitters. Based on the efficiency distribution determined at step 1102, the selection of which antennas are used as electromagnetic energy emitters may be optimized, at step 1104. Using the optimized selection of emitter antennas, at 1106, the formation may be heated as explained above. At step 1108, the spatial distribution of temperature (map) may be monitored during heating to assure that the formation is being suitably heated. At step 1110, if the temperature map indicates acceptably distributed formation heating, the heating may continue until a suitable sample temperature is attained. For example, an acceptably distributed formation heating may be achieved when the viscosity has decreased to a level of 100 cP to 300 cP in a formation volume of approximately 15 dm$^3$. To estimate if acceptably distributed formation heating has occurred, a scheme to predict variations of viscosity with temperature may be used, for example, a model, such as presented above, or measurements, such as NMR measurements. If the temperature map indicates an ineffective heating pattern, then at step 1112, the selection of the spatial distribution of energy emitters may be reevaluated. Alternatively, if the temperature map indicates an ineffective heating pattern, then at step 1114, the heating efficiency of the various antennas used as electromagnetic energy emitters may be reevaluated, for example, by adjusting the thermal properties of a formation model. If the heating efficiency distribution is not acceptable, then at step 1116, the saturation map may be reevaluated. Heating may then continue.

Figure 17:
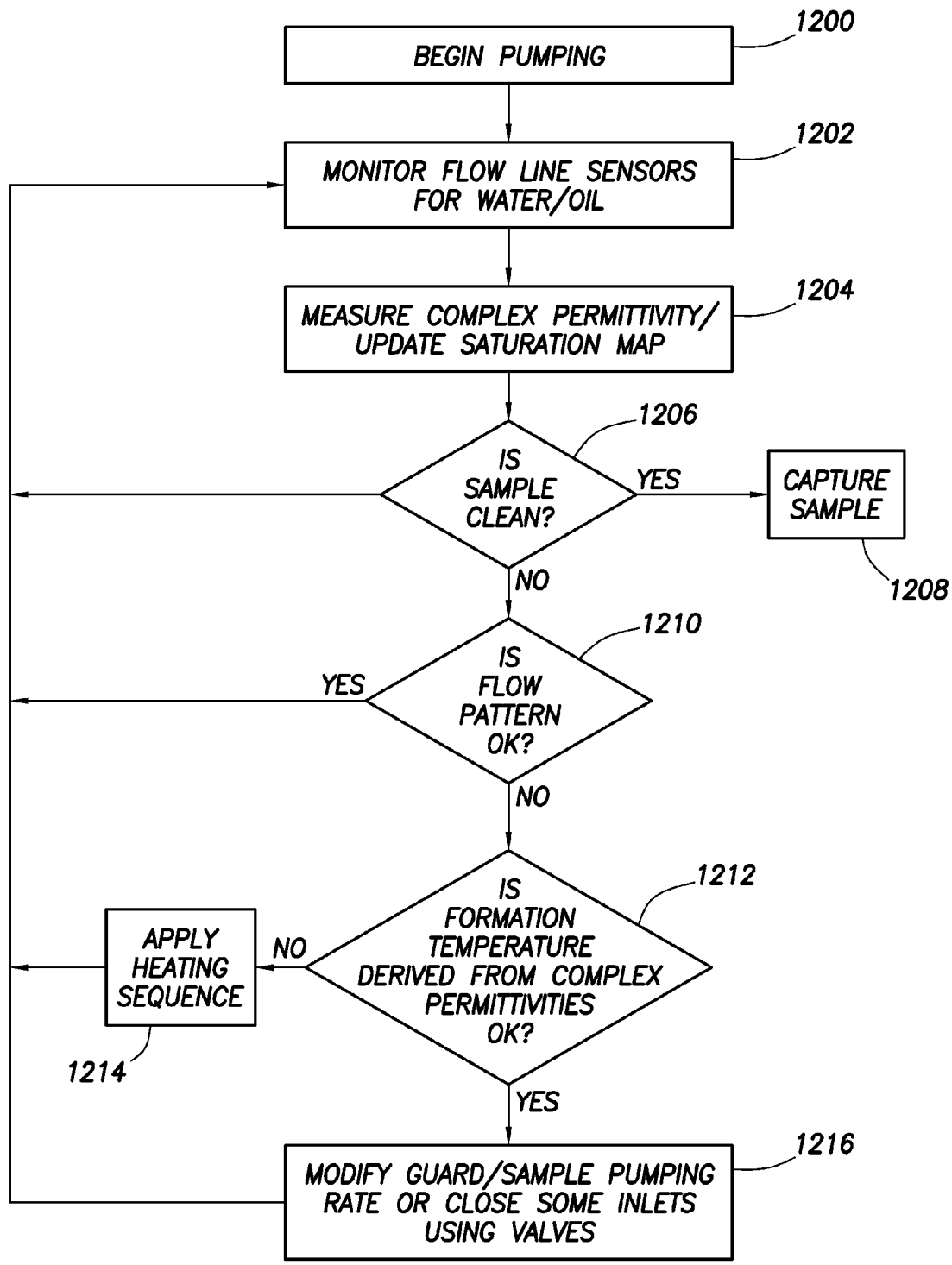
FIG. 17 is a flow chart of a sampling method according to one or more aspects of the present application.

Referring to FIG. 17, during extraction of a fluid sample, various parameters explained above with reference to FIG. 15 may be monitored and updated, and adjustments may be made to the sample extraction rate and guard fluid extraction rate to optimize sample extraction. In particular, the method illustrated in FIG. 17 may be used to implement one or more aspects described in the method of FIG. 15.

At step 1200, sample extraction or pumping begins. This is equivalent to what was described with reference to 1014 in FIG. 15. At step 1202, flowline sensors are monitored, for example, in a similar manner to what was described with reference to step 1020 in FIG. 15. At 1204, a water saturation map is updated to reflect withdrawal of fluids from the rock formation, for example, in a similar manner to what was described with reference to step 1016 in FIG. 15. At step 1206, if it is determined that the sample is "clean", that is includes substantially only connate hydrocarbon fluids and little if any drilling fluid filtrate, the sample is captured at step 1208, for example in a similar manner to what was described with reference to step 1024 in FIG. 15. If the sample is not clean, at step 1212, the spatial distribution of temperature is interrogated using the spatially distributed complex permittivity measurements explained with reference to FIG. 13. A temperature distribution indicating that further heating is deemed useful, results at step 1214 in selected ones of the antennas (46 in FIG. 14) being energized to emit electromagnetic energy. The process returns to step 1202 while additional sample volume is withdrawn. If the complex permittivity measurements indicate that the temperature distribution is acceptable, the rate of withdrawal of either the sample or the guard fluid may be adjusted at step 1216. For example, pumping rates (such as provided by pumps 42 and/or 44 in FIG. 14) may be adjusted. Alternatively, one or more valves (such as valves 53 and/or 55 in FIG. 14) may be selectively opened or closed to adjust flow rates through one or more inlets of the sampling tool (such as drains 48 and/or 50 in FIG. 14).

Turning now to FIG. 18, a chart describing a method according to one or more aspects of the present disclosure is shown. In the example shown in FIG. 18, a fluid is introduced into the formation and is heated using a RF source, such as the electromagnetic emitter previously described.

At step 200, a fluid is introduced into the formation. The fluid may be, for example, water based mud, water based mud filtrate, water, saline water, aqueous based fluid, oil based mud, oil based mud filtrate, oil, oil based fluid, or some other fluid composition particularly suitable for the purposes intended. The fluid may be introduced into the formation just after drilling, for example, because the drilled well pressure is above the reservoir pressure. Alternatively, the fluid may be conveyed downhole, for example in a sample chamber disposed in a sampling tool (such as sample chamber 926 and 928 in FIG. 6), and forcibly injected into the formation though a probe inlet of the sampling tool using a pump. In particular, the injected fluid may be saline water having a known salinity (e.g., a salinity determined prior to injection into the formation, for example at surface).

At step 210, a volume fraction in the pore space or a saturation level of the fluid introduced into the formation is measured by the sampling tool in the wellbore, for example using NMR measurement techniques, dielectric permittivity techniques, etc. In some cases, the volume fraction may be continuously measured along the well to produce a saturation log. At one or more location(s) having a measured volume fraction suitable for efficient heating of the formation by an electromagnetic emitter configured to heat the introduced fluid, the sampling tool may be set.

At step 220, one or more selected emitter(s) conveyed by the sampling tool may be actuated to expose the formation to electromagnetic radiation at one or more frequencies selected to heat the fluid introduced in the formation. For example, a saturation map may be displayed to a surface operator at which time the surface operator may select the one or more selected emitter(s) to be actuated.

At step 230, a temperature is monitored during heating. Optionally, the actuation of the emitters is controlled to insure efficient heating of the formation, and/or to insure that the temperature increase of the formation connate fluid does not exceed a temperature at which phase transition may occur in the formation connate fluid. For example, the method as described in FIG. 16 may be used. In some cases, the temperature may be monitored and controlled using the method described in FIG. 13.

At step 240, a determination of whether the temperature reached in the formation has reached a level suitable for sampling is made. For example, the method as described in FIG. 10 may be used to determine if the viscosity of the connate formation fluid has been sufficiently lowered for the connate formation fluid to flow through the formation pore space and/or into the downhole sampling tool. If the temperature is deemed suitable at step 240, then sampling may be initiated at step 250. Otherwise, a determination of whether heating is to be continued is made at step 242. For example, if the temperature in the formation is low, heating may continue at step 220. Otherwise, a determination of whether additional fluid may be injected into the formation is made at step 244. Optionally, additional fluid may be introduced into the formation, as shown at step 260, and heating may resume at step 210.

At step 246, a determination of whether sampling operations may be aborted at the current location is made. In some cases, a sample may not be obtained in a timely fashion at the current location. In this case, the sampling tool may be unset and moved to another location along the well at step 270. Otherwise, sampling may be performed at step 270. During sampling operations, heating may continue, and the heating process may be updated using, for example, one or more aspects of the method described in FIG. 16. Also, the sampling procedure may be updated to efficiently draw connate formation fluid into the sampling tool. In some cases, the sampling procedure may be updated using one or more aspects of the method described in FIG. 17.

In view of all of the above and FIGS. 1 to 18, it should be readily apparent to those skilled in the art that the present disclosure provides a method for extracting a sample from a subsurface formation comprising conveying a downhole tool in a wellbore drilled through the subsurface formation, the downhole tool having an emitter of electromagnetic energy configured to heat water in the subsurface formation, and an antenna configured to detect a signal having characteristics related to a water saturation of a portion of the formation, determining a parameter indicative of a water saturation in the portion of the formation based on the signal detected by the antenna, and actuating the emitter to expose the portion of the formation to electromagnetic energy based on the determined parameter. Actuating the emitter to expose the portion of the formation to electromagnetic energy may comprise exposing the portion of the formation to electromagnetic radiation at one or more frequencies in the range from 0.3 gigahertz to 3 gigahertz. Actuating the emitter to expose the portion of the formation to electromagnetic energy may comprise exposing the portion of the formation to electromagnetic radiation at a frequency of approximately 1 gigahertz. The emitter of electromagnetic energy configured to heat water in the subsurface formation may be a first emitter, the downhole tool may further comprise a second emitter of electromagnetic energy configured to heat hydrocarbon in the subsurface formation, and the method may further comprise actuating the second emitter based on the determined parameter. Actuating the second emitter may comprise exposing the portion of the formation to electromagnetic radiation at one or more frequencies of at least 40 gigahertz. The method may further comprise determining a plurality of parameter values indicative of water saturation in the portion of the formation along a substantial portion of a wellbore length, and positioning the downhole tool at a location along the wellbore selected based on the plurality of parameter values. The method may further comprise introducing at least one of water based mud filtrate, an aqueous based fluid, and saline water into the formation based on the determined parameter indicative of water saturation in the portion of the formation. Determining the parameter indicative of water saturation in the portion of the formation based on the signal detected by the antenna may comprise at least one of measuring a NMR response of the portion of the formation and, measuring a permittivity of the portion of the formation. The antenna may be configured to detect a signal having characteristics related to a permittivity of the portion of the formation, and the method may further comprise determining a temperature in the portion of the formation based on the signal related to a permittivity of the portion of the formation; and controlling the actuating of the emitter to expose the portion of the formation to electromagnetic energy based on the determined temperature. The downhole tool may further comprise a sample chamber, and the method may further comprise capturing the sample into the sample chamber. Actuating the emitter to expose the portion of the formation to electromagnetic energy based on the determined parameter may comprise actuating the emitter based on a comparison between the determined parameter and a threshold value.

The present disclosure also provides a downhole tool for extracting a sample from a subsurface formation comprising an emitter of electromagnetic energy configured to heat water in the subsurface formation, an antenna configured to detect a signal having characteristics related to a water saturation in a portion of the formation, a processor configured to determine a parameter indicative of water saturation in the portion of the formation based on the signal detected by the antenna, and a controller configured to selectively actuate the emitter to expose the portion of the formation to electromagnetic energy based on the determined parameter. The controller for selectively actuating the emitter may comprise an input interface configured to receive commands from an operator. The emitter of electromagnetic energy may be configured to emit electromagnetic radiation in a portion of the subsurface formation at one or more frequencies in the range from 0.3 gigahertz to 3 gigahertz. The emitter of electromagnetic energy may be configured to emit electromagnetic radiation in a portion of the subsurface formation at a frequency of approximately 1 gigahertz. The emitter of electromagnetic energy configured to heat water in the subsurface formation may be a first emitter, and the downhole tool may further comprise a second emitter of electromagnetic energy configured to heat hydrocarbon in the subsurface formation. The second emitter may be configured to emit electromagnetic radiation in a portion of the subsurface formation at one or more frequencies of at least 40 gigahertz. The antenna may comprise at least one of a dielectric antenna and a NMR antenna. The antenna may be further configured to detect a signal having characteristics related to a permittivity of a portion of the formation, and the processor may be further configured to determine a parameter indicative of a temperature of the portion of the formation based on the detected signal related to the permittivity. The downhole tool may be configured to be conveyed in a wellbore drilled through the subsurface formation via at least one of a wireline cable, a tubing, and a drill string.

The present disclosure also provides a downhole tool for extracting a sample from a subsurface formation comprising an emitter of electromagnetic energy configured to heat water in the subsurface formation. The emitter may comprise an energy outlet configured to be placed adjacent to a wall of a wellbore penetrating the subsurface formation. The downhole tool may further comprise a temperature sensor configured to be placed adjacent to a wall of a wellbore penetrating the subsurface formation. The temperature sensor comprises an antenna configured to detect a signal having characteristics related to a permittivity of a portion of the formation, and a processor configured to determine a parameter indicative of a temperature of the portion of the formation based on the detected signal. The downhole tool may further comprise a water saturation sensor. The water saturation sensor comprises an antenna configured to detect a signal having characteristics related to a permittivity of a portion of the formation, and a processor configured to determine a parameter indicative of water saturation in the portion of the formation based on the detected signal. The downhole tool may further comprise a fluid inlet operable to be placed in sealing engagement with a wall of a wellbore penetrating the subsurface formation, and a sample chamber selectively placed in hydraulic communication with the fluid inlet for capturing the sample into the sample chamber. The downhole tool may further comprise a plurality of fluid inlets disposed on an inflatable packer configured to seal a portion of the wellbore wall adjacent to the fluid inlets. The downhole tool may further comprise an emitter of electromagnetic energy configured to heat hydrocarbon in the subsurface formation. The downhole tool may be configured to be conveyed in a wellbore drilled through the subsurface formation via at least one of a wireline cable, a tubing, and a drill string.

The present disclosure also provides a method for extracting a sample from a subsurface formation comprising conveying a downhole tool in a wellbore drilled through the subsurface formation, the downhole tool having an emitter of electromagnetic energy configured to heat water in the subsurface formation, and actuating the emitter to expose a portion of the formation to electromagnetic energy. The method may further comprise determining a temperature of the portion of the formation, and controlling the actuating of the emitter based on the determined temperature. Determining the temperature of the portion of the formation may comprise measuring a parameter related to a permittivity of the portion of the formation, and computing a parameter indicative of the temperature of the portion of the formation from the measured parameter. The method may further comprise determining a phase transition temperature of a formation connate fluid, and controlling the actuating of the emitter based on the determined phase transition temperature to insure single phase sampling. The method may further comprise determining a water saturation of the portion of the formation, and controlling the actuating of the emitter based on the determined water saturation. Determining the water saturation of the portion of the formation may comprise measuring a parameter related to a permittivity of the portion of the formation, and computing a parameter indicative of a water saturation of the portion of the formation from the measured parameter. The downhole tool may further comprise an emitter of electromagnetic energy configured to heat hydrocarbon in the subsurface formation, and the method may further comprise actuating the emitter configured to heat hydrocarbon in the subsurface formation. The method may further comprise determining at least one parameter related to a viscosity of the portion of the formation, and controlling the actuating of the emitter based on the determined parameter. The at least one parameter may comprise a temperature and a value representative of a viscosity versus temperature curve. The downhole tool may further comprise an inlet configured to admit formation fluid into the downhole tool, and the method may further comprise determining at least one parameter related to a viscosity of the portion of the formation, and initiating a flow rate of formation fluid through the inlet based on the measured parameter. The downhole tool further may comprise an inlet configured to admit formation fluid into the downhole tool, and the method may further comprise determining a water saturation of the portion of the formation, and adjusting a flow rate of formation fluid through the inlet based on the determined water saturation. The downhole tool may further comprise an inlet configured to admit formation fluid into the downhole tool, and the method may further comprise determining a phase transition pressure of a formation connate fluid, and adjusting a flow rate of formation fluid through the inlet based on the determined phase transition pressure to insure single phase sampling. The downhole tool may further comprise a sample chamber, and the method may further comprise capturing the sample into the sample chamber. The method may further comprise introducing at least one of water based mud, water based mud filtrate, an aqueous based fluid, and water in the formation.

The present disclosure also provides a downhole tool for extracting a sample from a subsurface formation comprising an emitter of electromagnetic energy configured to heat a fluid introduced into the subsurface formation. The emitter may comprise an energy outlet configured to be placed adjacent to a wall of a wellbore penetrating the subsurface formation. The downhole tool may further comprise a temperature sensor configured to be placed adjacent to a wall of a wellbore penetrating the subsurface formation. The downhole tool may further comprise a fluid inlet operable to be placed in sealing engagement with a wall of a wellbore penetrating the subsurface formation, and a sample chamber selectively placed in hydraulic communication with the fluid inlet for capturing the sample into the sample chamber. The downhole tool may further comprise a plurality of fluid inlets disposed on an inflatable packer configured to seal a portion of the wellbore wall adjacent to the fluid inlets. The downhole tool may be configured to be conveyed in a wellbore drilled through the subsurface formation via at least one of a wireline cable, a tubing, and a drill string.

The present disclosure also provides a method for extracting a sample from a subsurface formation comprising introducing a fluid into the formation, conveying a downhole tool in a wellbore drilled through the subsurface formation, the downhole tool having an emitter of electromagnetic energy configured to heat the fluid introduced in the subsurface formation, and actuating the emitter to expose a portion of the formation to electromagnetic energy. The method may further comprise determining a temperature of the portion of the formation, and controlling the actuating of the emitter based on the determined temperature. The method may further comprising determining a phase transition temperature of a formation connate fluid, and controlling the actuating of the emitter based on the determined phase transition temperature to insure single phase sampling. The method may further comprise determining at least one parameter related to a viscosity of the portion of the formation, and controlling the actuating of the emitter based on the determined parameter. The at least one parameter may comprise a temperature and a value representative of a viscosity versus temperature curve. The downhole tool may further comprise an inlet configured to admit formation fluid into the downhole tool, and the method may further comprising determining at least one parameter related to a viscosity of the portion of the formation, and initiating a flow rate of formation fluid through the inlet based on the measured parameter. The downhole tool further comprises an inlet configured to admit formation fluid into the downhole tool, and the method may further comprise determining a phase transition pressure of a formation connate fluid, and adjusting a flow rate of formation fluid through the inlet based on the determined phase transition pressure to insure single phase sampling. The downhole tool may further comprise a sample chamber, and the method may further comprise capturing the sample into the sample chamber. The method may further comprise introducing at least one of water based mud, water based mud filtrate, an aqueous based fluid, and water into the formation. In this case, a salinity of the at least one of water based mud, water based mud filtrate, aqueous based fluid, and water may be determined prior to introduction into the formation. Also, actuating the emitter to expose the portion of the formation to electromagnetic energy may comprise exposing the portion of the formation to electromagnetic radiation at one or more frequencies in the range from 0.3 gigahertz to 3 gigahertz. The method may further comprise introducing at least one of oil based mud, oil, oil based fluid, and oil based mud filtrate into the formation. In this case, actuating the emitter to expose the portion of the formation to electromagnetic energy may comprise exposing the portion of the formation to electromagnetic radiation at one or more frequencies of at least 40 gigahertz. The method may further comprise determining a plurality of parameter values indicative of an introduced fluid volume fraction along a substantial portion of a wellbore length, and positioning the downhole tool at a location along the substantial portion of a wellbore length selected from the plurality of parameter values.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A method for extracting a sample from a subsurface formation comprising:
   conveying a downhole tool in a wellbore drilled through the subsurface formation, the downhole tool having a sample chamber, an emitter of electromagnetic energy configured to heat water in the subsurface formation, and an antenna configured to detect a signal having characteristics related to a water saturation of a portion of the formation;
   determining a parameter indicative of a water saturation in the portion of the formation based on the signal detected by the antenna;
   actuating the emitter to expose the portion of the formation to electromagnetic energy based on the determined parameter; and
   capturing in the sample chamber a sample of formation fluid from the portion of the formation exposed to the electromagnetic energy.

2. The method of claim 1, wherein actuating the emitter to expose the portion of the formation to electromagnetic energy comprises exposing the portion of the formation to electromagnetic radiation at a frequency of approximately 1 gigahertz.

3. The method of claim 1, wherein the emitter of electromagnetic energy configured to heat water in the subsurface formation is a first emitter, wherein the downhole tool further comprises a second emitter of electromagnetic energy configured to heat hydrocarbon in the subsurface formation, the method further comprising actuating the second emitter based on the determined parameter.

4. The method of claim 3, wherein actuating the second emitter comprises exposing the portion of the formation to electromagnetic radiation at one or more frequencies of at least 40 gigahertz.

5. The method of claim 1, further comprising determining a plurality of parameter values indicative of water saturation in the portion of the formation along a substantial portion of a wellbore length, and positioning the downhole tool at a location along the wellbore selected based on the plurality of parameter values.

6. The method of claim 1, further comprising introducing at least one of water based mud filtrate, an aqueous based fluid, and saline water into the formation based on the determined parameter indicative of water saturation in the portion of the formation.

7. The method of claim 1, wherein determining the parameter indicative of water saturation in the portion of the formation based on the signal detected by the antenna comprises at least one of measuring a NMR response of the portion of the formation and, measuring a permittivity of the portion of the formation.

8. The method of claim 1, wherein the antenna is configured to detect a signal having characteristics related to a permittivity of the portion of the formation, and further comprising:
   determining a temperature in the portion of the formation based on the signal related to a permittivity of the portion of the formation; and
   controlling the actuating of the emitter to expose the portion of the formation to electromagnetic energy based on the determined temperature.

9. The method of claim 1, wherein actuating the emitter to expose the portion of the formation to electromagnetic energy based on the determined parameter comprises actuating the emitter based on a comparison between the determined parameter and a threshold value.

10. The method of claim 1 wherein:
    actuating the emitter to expose the portion of the formation to electromagnetic energy comprises exposing the portion of the formation to electromagnetic radiation at a frequency of approximately 1 gigahertz;

the emitter of electromagnetic energy configured to heat water in the subsurface formation is a first emitter;

the downhole tool further comprises a second emitter of electromagnetic energy configured to heat hydrocarbon in the subsurface formation;

the method further comprises actuating the second emitter based on the determined parameter;

actuating the second emitter comprises exposing the portion of the formation to electromagnetic radiation at one or more frequencies of at least 40 gigahertz;

the method further comprises determining a plurality of parameter values indicative of water saturation in the portion of the formation along a substantial portion of a wellbore length;

the method further comprises positioning the downhole tool at a location along the wellbore selected based on the plurality of parameter values;

the method further comprises introducing at least one of water based mud filtrate, an aqueous based fluid, and saline water into the formation based on the determined parameter indicative of water saturation in the portion of the formation;

determining the parameter indicative of water saturation in the portion of the formation based on the signal detected by the antenna comprises at least one of measuring a NMR response of the portion of the formation and measuring a permittivity of the portion of the formation;

the antenna is configured to detect a signal having characteristics related to a permittivity of the portion of the formation;

the method further comprises determining a temperature in the portion of the formation based on the signal related to a permittivity of the portion of the formation;

the method further comprises controlling the actuating of the emitter to expose the portion of the formation to electromagnetic energy based on the determined temperature;

the downhole tool further comprises a sample chamber;

the method further comprises capturing the sample into the sample chamber; and actuating the emitter to expose the portion of the formation to electromagnetic energy based on the determined parameter comprises actuating the emitter based on a comparison between the determined parameter and a threshold value.

11. A downhole tool for extracting a sample from a subsurface formation comprising:
   an emitter of electromagnetic energy configured to heat water in a portion of the formation;
   an antenna configured to detect a signal having characteristics related to a water saturation in the portion of the formation;
   a processor configured to determine a parameter indicative of water saturation in the portion of the formation based on the signal detected by the antenna;
   a controller configured to selectively actuate the emitter to expose the portion of the formation to electromagnetic energy based on the determined parameter;
   a fluid admitting assembly configured to draw fluid from the portion of the formation; and
   a fluid collecting chamber configured to receive fluid drawn from the portion of the formation through the fluid admitting assembly.

12. The downhole tool of claim 11, wherein the controller for selectively actuating the emitter comprises an input interface configured to receive commands from an operator.

13. The downhole tool of claim 11, wherein the emitter of electromagnetic energy is configured to emit electromagnetic radiation in the portion of the subsurface formation at a frequency of approximately 1 gigahertz.

14. The downhole tool of claim 11, wherein the emitter of electromagnetic energy configured to heat water in the subsurface formation is a first emitter, and further comprises a second emitter of electromagnetic energy configured to heat hydrocarbon in the subsurface formation.

15. The downhole tool of claim 14, wherein the second emitter is configured to emit electromagnetic radiation in the portion of the subsurface formation at one or more frequencies of at least 40 gigahertz.

16. The downhole tool of claim 11, wherein the antenna comprises at least one of a dielectric antenna and a NMR antenna.

17. The downhole tool of claim 11, wherein the antenna is further configured to detect a signal having characteristics related to a permittivity of the portion of the formation, and wherein the processor is further configured to determine a parameter indicative of a temperature of the portion of the formation based on the detected signal related to the permittivity.

18. The downhole tool of claim 11, wherein the downhole tool is configured to be conveyed in a wellbore drilled through the subsurface formation via at least one of a wireline cable, a tubing, and a drill string.

19. A downhole tool for extracting a sample from a subsurface formation, comprising:
   a first emitter of electromagnetic energy configured to emit electromagnetic radiation in a portion of the subsurface formation at one or more frequencies in the range from 0.3 gigahertz to 3 gigahertz;
   a second emitter of electromagnetic energy configured to heat hydrocarbon in the subsurface formation by emitting electromagnetic radiation in the subsurface formation at one or more frequencies of at least 40 gigahertz;
   an antenna configured to detect a signal having characteristics related to a water saturation in the portion of the formation, wherein the antenna comprises at least one of a dielectric antenna and a NMR antenna;
   a processor configured to determine a parameter indicative of water saturation in the portion of the formation based on the signal detected by the antenna;
   a controller configured to selectively actuate the emitter to expose the portion of the formation to electromagnetic energy based on the determined parameter;
   a fluid admitting assembly configured to draw fluid from the portion of the formation; and
   a fluid collecting chamber configured to receive fluid drawn from the portion of the formation through the fluid admitting assembly;
   wherein:
   the antenna is configured to detect a signal having characteristics related to a permittivity of a portion of the formation, and the processor is configured to determine a parameter indicative of a temperature of the portion of the formation based on the detected signal related to the permittivity; and
   the downhole tool is configured to be conveyed in a wellbore drilled through the subsurface formation via at least one of a wireline cable, a tubing, and a drill string.

* * * * *